(12) United States Patent
Ditmer et al.

(10) Patent No.: US 6,473,407 B1
(45) Date of Patent: Oct. 29, 2002

(54) INTEGRATED PROXY INTERFACE FOR WEB BASED ALARM MANAGEMENT TOOLS

(75) Inventors: Christine M. Ditmer, Fairview, TX (US); James DeGraf-Johnson, Colorado Springs, CO (US); Paul Glenn Franklin, Colorado Springs, CO (US); William C. Holford, Colorado Springs, CO (US); Randall W. King, Plano; Patrick W. Pirtle, Dallas, both of TX (US); Kenneth Joseph Qualls, Calhan, CO (US); Diane J. Wells, Allen, TX (US); Edward Ronald Zack, Jr., Green Mountain Falls, CO (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/159,517

(22) Filed: Sep. 24, 1998

Related U.S. Application Data

(63) Continuation-in-part of application No. 08/924,208, filed on Sep. 5, 1997, now Pat. No. 6,141,777.
(60) Provisional application No. 60/060,655, filed on Sep. 26, 1997.

(51) Int. Cl.[7] ................................................. H04J 3/02
(52) U.S. Cl. ........................................ 370/252; 370/259
(58) Field of Search ................................ 370/259, 360, 370/359, 377, 378, 384, 388, 389, 398, 400, 241, 244, 252, 253; 379/220, 209, 389, 204, 201; 348/14.11

(56) References Cited

U.S. PATENT DOCUMENTS

| | | |
|---|---|---|
| 4,160,129 A | 7/1979 | Peyser et al. |
| 4,345,315 A | 8/1982 | Cadotte et al. |
| 4,817,050 A | 3/1989 | Komatsu et al. |

(List continued on next page.)

FOREIGN PATENT DOCUMENTS

| | | |
|---|---|---|
| EP | 0 809 387 A2 | 5/1997 |
| JP | 09064870 A | 3/1997 |
| WO | WO97/11443 | 3/1997 |
| WO | WO 97/23988 | 7/1997 |
| WO | WO 98/19472 | 5/1998 |
| WO | WO 99/01826 | 1/1999 |

OTHER PUBLICATIONS

Meterology; Databases, "Inforonics offers controlled access to Web Meteorology", Information Today, Apr. 97, vol. 14, Issue 4, p53, 2p. This article reports that Inforonics has developed a controlled access gateway to MGA (Meteorological and Geoastrophysica).

(List continued on next page.)

*Primary Examiner*—Dang Ton

(57) ABSTRACT

A Web-based fault and alarm management tool that enables customers to monitor and analyze the performance of their voice and data network via a graphical user interface is provided. The tool provides customers an Internet/Intranet access to near real-time alarms, events, and performance statistics and configuration reports corresponding to their switched network, including voice network, broadband, dedicated point-to-point circuits, and signaling services, for enabling customers to make informed network management decisions. A Web-based fault and alarm management infrastructure which enables the secure initiation, acquisition, and presentation of customer reports relating to network management via a Web browser on any computer is also provided.

28 Claims, 16 Drawing Sheets

U.S. PATENT DOCUMENTS

| | | |
|---|---|---|
| 4,893,248 A | 1/1990 | Pitts et al. |
| 4,972,504 A | 11/1990 | Daniel, Jr. et al. |
| 5,041,972 A | 8/1991 | Frost |
| 5,075,771 A | 12/1991 | Hashimoto |
| 5,131,020 A | 7/1992 | Liebesny et al. |
| 5,136,707 A | 8/1992 | Block et al. |
| 5,223,699 A | 6/1993 | Flynn et al. |
| 5,228,076 A | 7/1993 | Hopner et al. |
| 5,245,533 A | 9/1993 | Marshall |
| 5,262,760 A | 11/1993 | Iwamura et al. |
| 5,285,494 A | 2/1994 | Sprecher et al. |
| 5,287,270 A | 2/1994 | Hardy et al. |
| 5,313,598 A | 5/1994 | Yamakawa |
| 5,315,093 A | 5/1994 | Stewart |
| 5,325,290 A | 6/1994 | Cauffman et al. |
| 5,327,486 A | 7/1994 | Wolff et al. |
| 5,361,259 A | 11/1994 | Hunt et al. |
| 5,369,571 A | 11/1994 | Metts |
| 5,452,446 A | 9/1995 | Johnson |
| 5,475,836 A | 12/1995 | Harris et al. |
| 5,481,542 A * | 1/1996 | Logston et al. ............. 370/461 |
| 5,483,596 A | 1/1996 | Rosenow et al. |
| 5,490,060 A | 2/1996 | Malec et al. |
| 5,491,779 A | 2/1996 | Bezjian |
| 5,526,257 A | 6/1996 | Lerner |
| 5,530,744 A | 6/1996 | Charalambous et al. |
| 5,537,611 A | 7/1996 | Rajagopal et al. |
| 5,539,734 A | 7/1996 | Burwell et al. |
| 5,548,726 A | 8/1996 | Pettus |
| 5,551,025 A | 8/1996 | O'Reilly et al. |
| 5,555,290 A | 9/1996 | McLeod et al. |
| 5,563,805 A | 10/1996 | Arbuckle et al. |
| 5,566,351 A | 10/1996 | Crittenden et al. |
| 5,586,260 A | 12/1996 | Hu |
| 5,602,918 A | 2/1997 | Chen et al. |
| 5,610,915 A * | 3/1997 | Elliott et al. ................. 370/259 |
| 5,621,727 A | 4/1997 | Vaudreuil |
| 5,623,601 A | 4/1997 | Vu |
| 5,630,066 A | 5/1997 | Gosling |
| 5,649,182 A | 7/1997 | Reitz |
| 5,650,994 A | 7/1997 | Daley |
| 5,659,601 A | 8/1997 | Cheslog |
| 5,666,481 A | 9/1997 | Lewis |
| 5,671,354 A | 9/1997 | Ito et al. |
| 5,689,645 A | 11/1997 | Schettler et al. |
| 5,692,030 A | 11/1997 | Teglovic et al. |
| 5,692,181 A | 11/1997 | Anand et al. |
| 5,694,546 A | 12/1997 | Reisman |
| 5,699,403 A | 12/1997 | Ronnen |
| 5,699,528 A | 12/1997 | Hogan |
| 5,706,502 A | 1/1998 | Foley et al. |
| 5,708,780 A | 1/1998 | Levergood et al. |
| 5,710,882 A | 1/1998 | Svennevik et al. |
| 5,721,913 A | 2/1998 | Ackroff et al. |
| 5,727,129 A | 3/1998 | Barrett et al. |
| 5,734,709 A | 3/1998 | DeWitt et al. |
| 5,734,831 A | 3/1998 | Sanders |
| 5,742,762 A | 4/1998 | Scholl et al. |
| 5,742,763 A | 4/1998 | Jones |
| 5,742,768 A | 4/1998 | Gennaro et al. |
| 5,742,905 A | 4/1998 | Pepe et al. |
| 5,745,754 A | 4/1998 | Lagarde et al. |
| 5,754,830 A | 5/1998 | Butts et al. |
| 5,757,900 A | 5/1998 | Nagal et al. |
| 5,764,756 A | 6/1998 | Onweller |
| 5,768,501 A | 6/1998 | Lewis |
| 5,774,660 A | 6/1998 | Brendel et al. |
| 5,778,178 A | 7/1998 | Arunachalam |
| 5,778,377 A | 7/1998 | Marlin et al. |
| 5,781,550 A | 7/1998 | Templin et al. |
| 5,787,160 A | 7/1998 | Chaney et al. |
| 5,787,412 A | 7/1998 | Bosch et al. |
| 5,790,780 A | 8/1998 | Brichta et al. |
| 5,790,789 A | 8/1998 | Suarez |
| 5,790,797 A | 8/1998 | Shimada et al. |
| 5,790,809 A | 8/1998 | Holmes |
| 5,793,762 A | 8/1998 | Penners et al. |
| 5,793,964 A | 8/1998 | Rogers et al. |
| 5,796,393 A | 8/1998 | MacNaughton et al. |
| 5,799,154 A | 8/1998 | Kuriyan |
| 5,802,320 A | 9/1998 | Baehr et al. |
| 5,805,803 A | 9/1998 | Birrell et al. |
| 5,812,533 A | 9/1998 | Cox et al. |
| 5,812,654 A | 9/1998 | Anderson et al. |
| 5,812,750 A | 9/1998 | Dev et al. |
| 5,815,080 A | 9/1998 | Taguchi |
| 5,815,665 A | 9/1998 | Teper et al. |
| 5,819,225 A | 10/1998 | Eastwood et al. |
| 5,819,271 A | 10/1998 | Mahoney et al. |
| 5,825,769 A * | 10/1998 | O'Reilly et al. ............ 370/360 |
| 5,825,890 A | 10/1998 | Elgamal et al. |
| 5,826,029 A | 10/1998 | Gore, Jr. et al. |
| 5,826,269 A | 10/1998 | Hussey |
| 5,832,519 A | 11/1998 | Bowen et al. |
| 5,835,084 A | 11/1998 | Bailey et al. |
| 5,844,896 A | 12/1998 | Marks et al. |
| 5,845,067 A | 12/1998 | Porter et al. |
| 5,845,267 A | 12/1998 | Ronen |
| 5,848,233 A | 12/1998 | Radia et al. |
| 5,848,396 A | 12/1998 | Gerace |
| 5,848,399 A | 12/1998 | Burke |
| 5,850,517 A | 12/1998 | Verkler et al. |
| 5,852,810 A | 12/1998 | Sotiroff et al. |
| 5,852,812 A | 12/1998 | Reeder |
| 5,862,325 A | 1/1999 | Reed et al. |
| 5,867,495 A | 2/1999 | Elliott et al. |
| 5,870,558 A | 2/1999 | Branton, Jr. et al. |
| 5,875,236 A | 2/1999 | Jankowitz et al. |
| 5,877,759 A | 3/1999 | Bauer |
| 5,881,237 A | 3/1999 | Schwaller et al. |
| 5,883,948 A | 3/1999 | Dunn |
| 5,884,032 A | 3/1999 | Bateman et al. |
| 5,884,312 A | 3/1999 | Dustan et al. |
| 5,892,900 A | 4/1999 | Ginter et al. |
| 5,907,681 A | 5/1999 | Bates et al. |
| 5,909,679 A | 6/1999 | Hall |
| 5,909,682 A | 6/1999 | Cowan et al. |
| 5,915,001 A | 6/1999 | Uppaluru |
| 5,920,542 A | 7/1999 | Henderson |
| 5,923,016 A | 7/1999 | Fredregill et al. |
| 5,930,764 A | 7/1999 | Melchione et al. |
| 5,930,804 A | 7/1999 | Yu et al. |
| 5,933,142 A | 8/1999 | LaStrange et al. |
| 5,937,165 A | 8/1999 | Schwaller et al. |
| 5,938,729 A | 8/1999 | Cote et al. |
| 5,949,976 A | 9/1999 | Chappelle |
| 5,953,389 A | 9/1999 | Pruett et al. |
| 5,956,714 A | 9/1999 | Condon |
| 5,958,016 A | 9/1999 | Chang et al. |
| 5,960,411 A | 9/1999 | Hartman et al. |
| 5,961,602 A | 10/1999 | Thompson et al. |
| 5,963,925 A | 10/1999 | Kolling et al. |
| 5,966,695 A | 10/1999 | Melchione et al. |
| 5,970,467 A | 10/1999 | Alavi |
| 5,974,396 A | 10/1999 | Anderson et al. |
| 5,974,441 A | 10/1999 | Rogers et al. |
| 5,982,864 A | 11/1999 | Jagadish et al. |
| 5,982,891 A | 11/1999 | Ginter et al. |
| 5,983,350 A | 11/1999 | Minear et al. |
| 5,991,733 A | 11/1999 | Aleia et al. |
| 5,991,746 A | 11/1999 | Wang |

| | | |
|---|---|---|
| 5,991,806 A | 11/1999 | McHann, Jr. |
| 5,995,948 A | 11/1999 | Whitford et al. |
| 5,999,525 A | 12/1999 | Krishnaswamy et al. |
| 5,999,965 A | 12/1999 | Kelly |
| 5,999,972 A | 12/1999 | Gish |
| 5,999,973 A | 12/1999 | Glitho et al. |
| 6,003,079 A | 12/1999 | Friedrich et al. |
| 6,006,265 A | 12/1999 | Rangan et al. |
| 6,011,844 A | 1/2000 | Uppaluru et al. |
| 6,012,090 A | 1/2000 | Chung et al. |
| 6,014,647 A | 1/2000 | Nizzari et al. |
| 6,014,702 A | 1/2000 | King et al. |
| 6,018,768 A | 1/2000 | Ullman et al. |
| 6,021,409 A | 2/2000 | Burrows |
| 6,023,762 A | 2/2000 | Dean et al. |
| 6,029,182 A | 2/2000 | Nehab et al. |
| 6,031,904 A | 2/2000 | An et al. |
| 6,032,132 A | 2/2000 | Nelson |
| 6,032,184 A | 2/2000 | Cogger et al. |
| 6,041,325 A | 3/2000 | Shah et al. |
| 6,041,357 A | 3/2000 | Kunzelman et al. |
| 6,044,144 A | 3/2000 | Becker et al. |
| 6,049,602 A | 4/2000 | Foladare et al. |
| 6,049,789 A | 4/2000 | Smorodinsky |
| 6,052,450 A | 4/2000 | Allison et al. |
| 6,058,170 A | 5/2000 | Jagadish et al. |
| 6,058,381 A | 5/2000 | Nelson |
| 6,064,667 A | 5/2000 | Gisby et al. |
| 6,065,002 A | 5/2000 | Knotts et al. |
| 6,065,059 A | 5/2000 | Shieh et al. |
| 6,072,493 A | 6/2000 | Driskell et al. |
| 6,073,105 A | 6/2000 | Sutcliffe et al. |
| 6,073,122 A | 6/2000 | Wool |
| 6,073,241 A | 6/2000 | Rosenberg et al. |
| 6,078,891 A | 6/2000 | Riordan et al. |
| 6,078,924 A | 6/2000 | Ainsbury et al. |
| 6,084,953 A | 7/2000 | Bardenheuer et al. |
| 6,085,171 A | 7/2000 | Leonard |
| 6,085,190 A | 7/2000 | Sakata |
| 6,088,451 A | 7/2000 | He et al. |
| 6,088,796 A | 7/2000 | Cianfrocca et al. |
| 6,091,808 A | 7/2000 | Wood et al. |
| 6,094,655 A | 7/2000 | Rogers et al. |
| 6,104,704 A | 8/2000 | Buhler et al. |
| 6,105,131 A | 8/2000 | Carroll |
| 6,108,700 A | 8/2000 | Maccobee et al. |
| 6,108,782 A | 8/2000 | Fletcher et al. |
| 6,112,238 A | 8/2000 | Boyd et al. |
| 6,112,242 A | 8/2000 | Jois et al. |
| 6,115,040 A | 9/2000 | Bladow et al. |
| 6,115,458 A | 9/2000 | Taskett |
| 6,115,693 A | 9/2000 | McDonough et al. |
| 6,115,737 A | 9/2000 | Ely et al. |
| 6,119,109 A | 9/2000 | Muratani et al. |
| 6,122,258 A | 9/2000 | Brown |
| 6,128,624 A | 10/2000 | Papierniak et al. |
| 6,130,933 A | 10/2000 | Miloslavsky |
| 6,131,095 A | 10/2000 | Low et al. |
| 6,131,116 A | 10/2000 | Riggins et al. |
| 6,134,584 A | 10/2000 | Chang et al. |
| 6,137,869 A * | 10/2000 | Voit et al. .................... 370/238 |
| 6,145,001 A | 11/2000 | Scholl et al. |
| 6,154,744 A | 11/2000 | Kenner et al. |
| 6,161,102 A | 12/2000 | Yanagihara et al. |
| 6,161,126 A | 12/2000 | Wies et al. ................. 709/203 |
| 6,161,128 A | 12/2000 | Smyk |
| 6,173,311 B1 | 1/2001 | Hassett et al. |
| 6,205,456 B1 | 3/2001 | Nakao |
| 6,212,506 B1 | 4/2001 | Shah et al. |
| 6,212,558 B1 | 4/2001 | Antur et al. |
| 6,240,450 B1 | 5/2001 | Sharples et al. |
| 6,253,239 B1 | 6/2001 | Shklar et al. |
| 6,286,050 B1 | 9/2001 | Pullen et al. |
| 6,292,481 B1 | 9/2001 | Voit et al. |
| 6,295,551 B1 | 9/2001 | Roberts et al. |
| 2001/0001014 A1 | 5/2001 | Akins, III et al. |

OTHER PUBLICATIONS

Rosen, Michele, "BPCS steps into new millennium", Midrange Systems; Spring House; May 10, 1996. This article informs about the new release of BPCS Client/Server Software as the most extensive upgrade of the product since 1980s. It incorporates onject tech.

Inoue et al., "Secure Mobile IP Using Security Primitives", IEEE 1997.

Quadri et al., Hewlett–Packard and Cisco Systems, "Internet Usage Platform" White Paper.

"HP and Cisco Deliver Internet Usage Platform and Billing Analysis Solutions, New Platform and Solutions Allow ISPs and Carriers to Offer Value–added Services", Copyright 1998 Cisco Systems, Inc. http://www.cisco.com/warp/public/146/pressroom/1998/apr98/28.html.

HP Smart Internet, "Transform User Data Into Revenue", Copyright Hewlett–Packard Company, 1999.

HP Smart Internet Usage Analysis Solution, "Transform User Data Into Competitive Advantage", Copyright Hewlett–Packard Company, 1999.

HP/Cisco, Internet Usage Platform, "Transforming Internet Services Into Revenue" ©Hewlett–Packard Co. 1998.

"Release Note for Netflow FlowCollector Release 2.0," © Jul. 1998 and "Release Notes for Netflow FlowAnalyzer Release, 1.0" ©Sep. 1997.

HP Invent, "Capturing the Usage Billing Advantage", Copyright 1994–2001, Hewlett Packard http://www.hp.com/communications/usage/infolibrary/whitepapers/dsforum_print.html.

Anonymous, "Call Accounting Products", Teleconnect, vol. 15, No. 3, p. 89, Mar. 1997.

Deixler, Lyle, "Call Accounting Update", Teleconnect, vol. 15, No. 10, p. 87, Oct. 1997.

Deixler, Lyle, "Micro–Tel's Microcall for Windows 95/NT", Teleconnect, vol. 15, No. 12, p. 35, Dec. 1997.

Biggs, M., "Help for the Web enhances customer support, reduces help desk load" *Inforworld,* Jun. 16, 1997, v. 19, No. 24, pp. 82+.

Burch, B., "AT&T, MCI to release new management tools", *Network World,* Jan. 17, 1994, p. 19.

Low, C., "Integrating Communications Services", *IEEE Communication Magazine,* Jun. 1997, pp. 164–169.

"McAfee's New 'Self–Service' Help Desk Web Suite Makes PCs Help Desk–Ready", Newswire Association Inc., Oct. 13, 1997.

Niemeyer, R., "Using Web Technologies in Two MLS Environments: A Security Analysis." *IEEE,* pp. 205–214, 1997.

Porter, T., "MCI offers tracking system: Direct Dispatch lets users eye problems remotely", *Service News,* Apr. 1994, p. 17.

Shklar, L., et al., "MetaMagic: Generating Virtual Web Sites Through Data Modeling," http://www.scope.gmd.de/info/www6/posters/714/poster714.html.

Vizard, M. et al., "MCI to Pilot Convergence Billing Service", *InfoWorld,* v. 18, Issue 37, Sep. 9, 1996.

Yager, T., "Mixed Messages", *UNIX Review,* v. 16, n. 2, p. 29, Feb. 1998.

"Carriers Improve Net Management Services", *Communications Week,* May 2, 1994, p. 74.

"Network management; new software platform enhances network management capabilities; MCI ServiceView offers greater cost savings, increased flexibility.", Product Announcement, *Edge,* Oct. 2, 1995, on & about AT&T, v. 10, n. 375, p. 11(1).

"New software platform enhances network management capabilities . . . ," *Business Wire,* Sep. 28, 1995 p. 9281122.

"User's Guide: Microsoft Access", Microsoft Corporation, 1994, pp. 378,594,599, 630–632 (13).

Jainschigg, J., "Billing confirmed: this easy–to–use box turns guest calls into revenue." *Teleconnect,* vol. 12, No. 9, p. 39(4).

Chapman, D. Brent et al., "Building Internet Firewalls", Nov. 1995, O'Reilly & Associates, p. 58.

He, Taniguchi, "Internet Traffic Control and Management Architecture", IEEE, Oct. 22–24, 1998, pp. s46–03–1—s46–03–5.

Sixth International Conference on Network Protocols, IEEE, Technical Communication Services, Oct. 13–16, 1998, Table of Contents.

Markovich, Robert, "WAN Service Level Management Could Keep Your Feet Out of the Fire, Ensure Carriers Dilligence", Network World, Jul. 7, 1997.

Kenney, Kathleen, "American Management Systems Launces Internet–Based Customer Care and Billing Tool for Telecom Firms", PR Newswire, New York, Oct. 9, 1996, extracted from *http://proquest.umi.com* on internet Feb. 28, 2002.

Morgan, Rick, "When Used Right, Internet can be Effective Marketing Tool", Madison Capital Times, Madison, WI, Nov. 8, 1996, extracted from *http://proquest.umi.com* on internet on Feb. 28, 2002.

Edwards, Morris, "The Electronic Commerce Juggernaut", Communication News, Nokomis, Sept. 1997, vol. 34, Issue 9, extracted from *http://proquest.umi.com* on internet on Feb. 28, 2002.

"Cryptography and the Internet", *www.echonyc.com/~ysue/crypt.html,* 1995.

Lee et al., "Supporting Multi–User, Multi–Applet Workspaces in CBE", Computer Supported Cooperatve Work 1996, Cambridge, MA.

"Netscape 2.0 Beta Hip or Hype?", *www.plant.net.au/innovations/20beta.html,* Planet Internet, 1995.

* cited by examiner

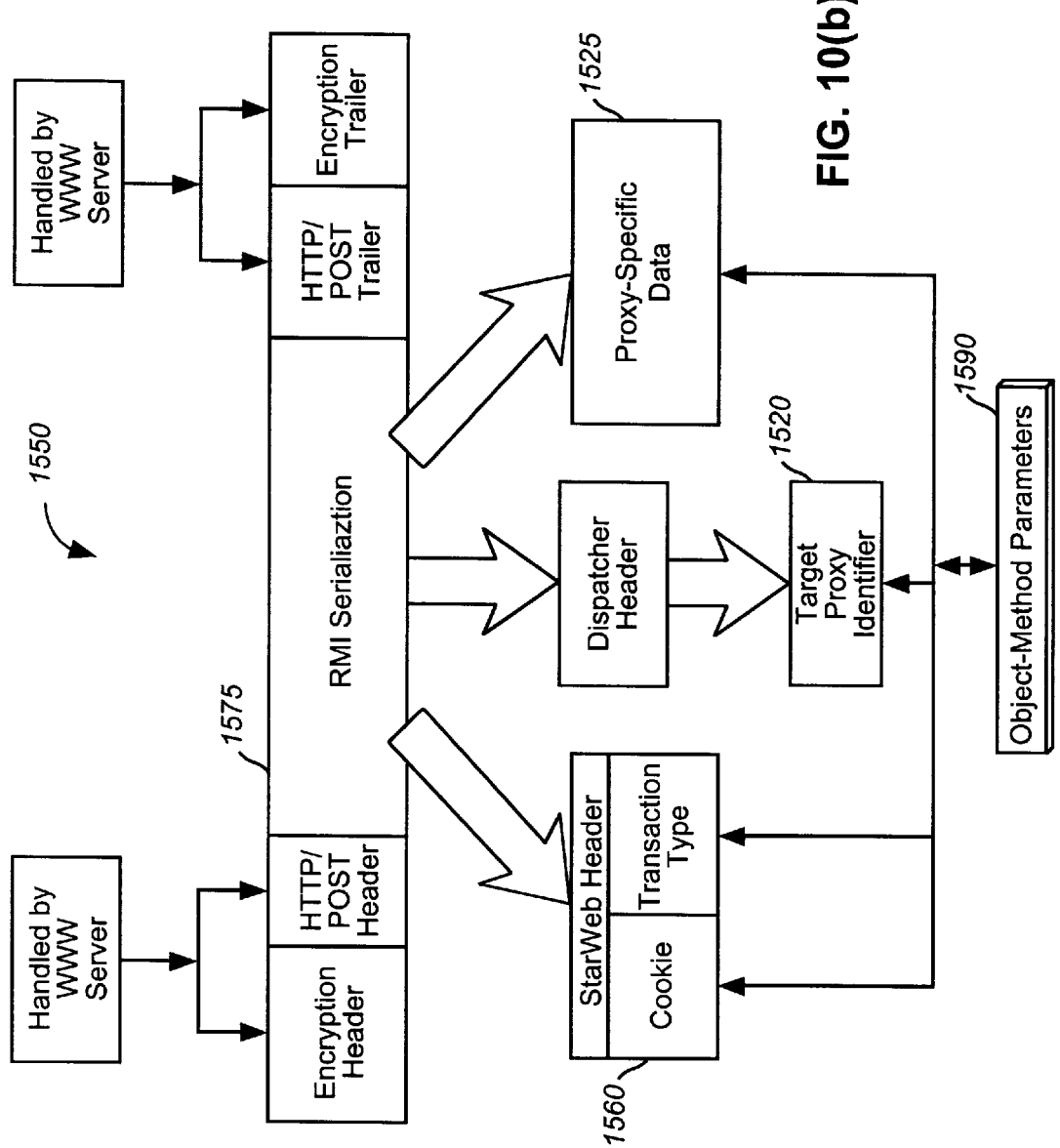

INTEGRATED PROXY INTERFACE FOR WEB BASED ALARM MANAGEMENT TOOLS

CROSS-REFERENCE TO RELATED APPLICATIONS

This application is a continuation-in-part of U.S. Pat. No. 08/924,208 filed Sep. 5, 1997, entitled SYSTEM AND METHOD FOR REPORTING TELECOMMUNICATION SERVICE CONDITIONS, now U.S. Pat. No. 6,141,777, and claims the benefit of U.S. Provisional Patent Application Ser. No. 60/060,655, filed Sep. 26, 1997, entitled INTEGRATED CUSTOMER INTERFACE SYSTEM FOR COMMUNICATIONS MANAGEMENT.

BACKGROUND OF THE INVENTION

1. Field of the Invention

The present invention relates generally to an Internet enabled system for monitoring call conditions on a telecommunications network, and more specifically is directed toward a system and a method for interactive reporting of network events, including alarms and other network conditions affecting a customer's telecommunication service, directly to a customer.

2. Background Art

Customers of major telecommunications services have in the past relied upon their telecommunications carriers to identify network problems and take corrective measures. Typically, common carriers conduct a continuous fault monitoring process throughout their networks to identify, locate and correct conditions which adversely affect voice and data lines, after which, the common carriers make the obtained fault information, i.e., information regarding network events, available to the customers of various leased facilities. The customers may then take some corrective measures to mitigate faults that occur over the leased services.

In conventional customer enabled network event monitoring systems, a connection is made with a large legacy system via a dial-up connection from a customer owned personal computer or workstation. This connection frequently, although not always, emulates a terminal addressable by the legacy system. The dial-up access requires custom software on the customer workstation to provide dial-up services, communication services, emulation and/or translation services and generally some resident custom form of the legacy application to interface with the midrange or mainframe computer running the legacy system.

There are several problems associated with this approach. First, the aforementioned software is very hardware specific, and customers generally have a wide range of workstation vendors, which requires extensive inventory for distribution, and generally, intensive customer hand holding through initial setup and installation before reliable and secure sessions are possible. If the customer hardware platform changes through an upgrade, most of these issues need renegotiation.

Second, dial-up modem and communications software interact with each other in many ways which are not always predictable to a custom application, requiring extensive troubleshooting and problem solving for an enterprise desiring to make the legacy system available to the customer, particularly where various telephone exchanges, dialing standards or signal standards are involved.

Third, when an enterprise desires to make more than one system available to the customer, the custom application for one legacy system is not able to connect to a different legacy system, and the customer must generally logoff and logon to switch from one to the other. Moreover, the delivery technologies used by the two legacy systems may be different, requiring different interface standards, and different machine level languages may be used by the two systems, as for example, the 96 character EBCDIC language used by IBM, and the 127 character ASCII language used by contemporary personal computers.

Finally, the security and entitlement features of the various legacy systems may be completely different, and vary from system to system and platform to platform. It is, therefore, desired to provide connectivity to enterprise legacy systems over the public Internet, as the Internet provides access connectivity world wide via the TCP/IP protocol, without need to navigate various telephone exchanges, dialing standards or signal standards.

One such type of legacy system for the telecommunications industry is known as a fault or alarm management system which can provide a range of services, including fault information regarding network events, to the customers of the enterprise. The delivery of information relating to these service problems, to the department or location within a customer's organization that is responsible for managing their leased facilities, would permit the customer to analyze various fault conditions and traffic patterns within their portion of the network and to manage these facilities more economically. However, providing individual telecommunications management information to telecommunications customers is complicated by the fact that different customers lease different types of services, precluding a "one size fits all" solution to network management.

Thus, what is needed is a system and a method for allowing customers of leased telecommunications services to remotely access information pertaining to performance at their facility. This remote access must enable a customer to seamlessly view near real-time custom events specific to the services leased by a telecommunications customer. Customers further desire an open access route to this information. The rapid adoption and wide use of the Internet for data exchange has compelled a desire on the part of customers to access their data over the Internet.

The present invention is one component of an integrated suite of customer network management and report applications using the Internet and a World Wide Web ("WWW" or "Web") Web browser paradigm. Introduced to the communications industry as the "networkMCI Interact," the integrated suite of Web-based applications provides an invaluable tool for enabling customers of a telecommunications enterprise to manage their telecommunication assets, quickly and securely, from anywhere in the world.

The popularity of the public Internet provides a measure of platform independence for the customer, as the customer can run his/her own Internet Web browser and utilize his/her own platform connection to the Internet to enable service. This resolves many of the platform hardware and connectivity issues in the customer's favor, and lets the customer choose their own platform and operating system. Web-based programs can minimize the need for training and support since they utilize existing client software, i.e. a Web browser, which the user has already installed and already knows how to use. Moreover, there is no longer a need to produce and distribute voluminous hard copies of documentation including software user guides. Further, if the customer later changes that platform, then, as soon as the new platform is Internet enabled, service is restored to the customer. The connectivity and communications software burden is thus resolved in favor of standard and readily available hardware and the browser and dial-up software used by the public Internet connection.

An Internet delivered paradigm obviates many of the installation and configuration problems involved with initial setup and configuration of a customer workstation, since the custom application required to interface with the legacy system can be delivered via the public Internet and run within a standard Web browser, reducing application compatibility issues to browser compatibility issues.

For the enterprise, the use of off-the-shelf Web browsers by the customer significantly simplifies the enterprise burden by limiting the client development side to screen layouts and data presentation tools that use a common interface enabled by the Web browser. Software development and support resources are thus available for the delivery of the enterprise legacy services and are not consumed by a need for customer support at the work station level.

SUMMARY OF THE INVENTION

The present invention is an event monitor application system for providing customers with various reports and information relating to their dedicated voice and data networks in real time or near-real time, and allowing them to make informed network management decisions in controlling their business telecommunications networks. The event monitor application of the present invention provides an integrated Web-based graphical, user-friendly interface to receive information on the performance of their dedicated voice and data networks, by presenting physical and logical network configuration, physical and logical network alarms, and physical and logical performance information pertaining to the circuits which comprise customers' dedicated voice and data networks, on a real time or a near-real time basis. Thus, via the Web-based interface, customers may monitor their dedicated voice and data circuits, receive network alarms on degraded or broken circuits, and devise immediate and efficient troubleshooting procedures accordingly.

Using the Web-based graphical user interface (GUI), customers may also define or display customized troubleshooting procedures for specific alarms or circuits, and define or display customized alarm filters to specify which alarms may appear in the alarm presentation. Customers may also access via the Web-based GUI a database of their monitored facilities, e.g., dedicated voice and data circuits. In addition, with the present invention, customers may display and/or print lists of active alarms, as well as generate reports about network performance via their Web-enabled workstation.

For providing a system and a method for communicating information relating to the dedicated voice and data networks, from an enterprise to a customer at a client workstation, the present invention includes a client browser application located at the client workstation. The client browser application enables interactive Web-based communications with the event monitor system and also provides an integrated interface to the various enterprise application services. The client browser application invokes a Java application/applet specifically for performing the event monitor functionality. Via the event monitor Java application/applet, customers may define and display reports associated with the derived alarms and the performance statistics at the client terminal.

At the enterprise location, the present invention includes various systems for collecting statistics on performance of the dedicated voice and data network and deriving performance alarms based on the performance statistics. A server system is included to receive and store the performance statistics and the derived alarms from the collecting systems. Accordingly, using the present invention, customers with workstations having generic Web browsers, for example, the Internet Explorer 4.0, may receive, view, and monitor various alarms and performance statistics relating to their dedicated voice and data network.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENT OF THE INVENTION

An Overview of the Web-enabled Integrated System

The present invention is one component of an integrated suite of customer network management and report applications using a Web browser paradigm. Known as the networkMCI Interact system ("nMCI Interact") such an integrated suite of Web-based applications provides an invaluable tool for enabling customers to manage their telecommunication assets, quickly and securely, from anywhere in the world.

As described in co-pending U.S. patent application Ser. No. 09/159,695, the nMCI Interact system architecture is basically organized as a set of common components comprising the following:

1) an object-oriented software architecture detailing the client and server based aspect of nMCI Interact;

2) a network architecture defining the physical network needed to satisfy the security and data volume requirements of the networkMCI System;

3) a data architecture detailing the application, back-end or legacy data sources available for networkMCI Interact; and 4) an infrastructure covering security, order entry, fulfillment, billing, self-monitoring, metrics and support.

Each of these common component areas will be generally discussed hereinbelow. A detailed description of each of these components can be found in a related, co-pending U.S. patent application Ser. No. 09/159,695 entitled INTEGRATED CUSTOMER INTERFACE SYSTEM FOR COMMUNICATIONS NETWORK MANAGEMENT, the disclosure of which is incorporated herein by reference thereto.

Figure 1:
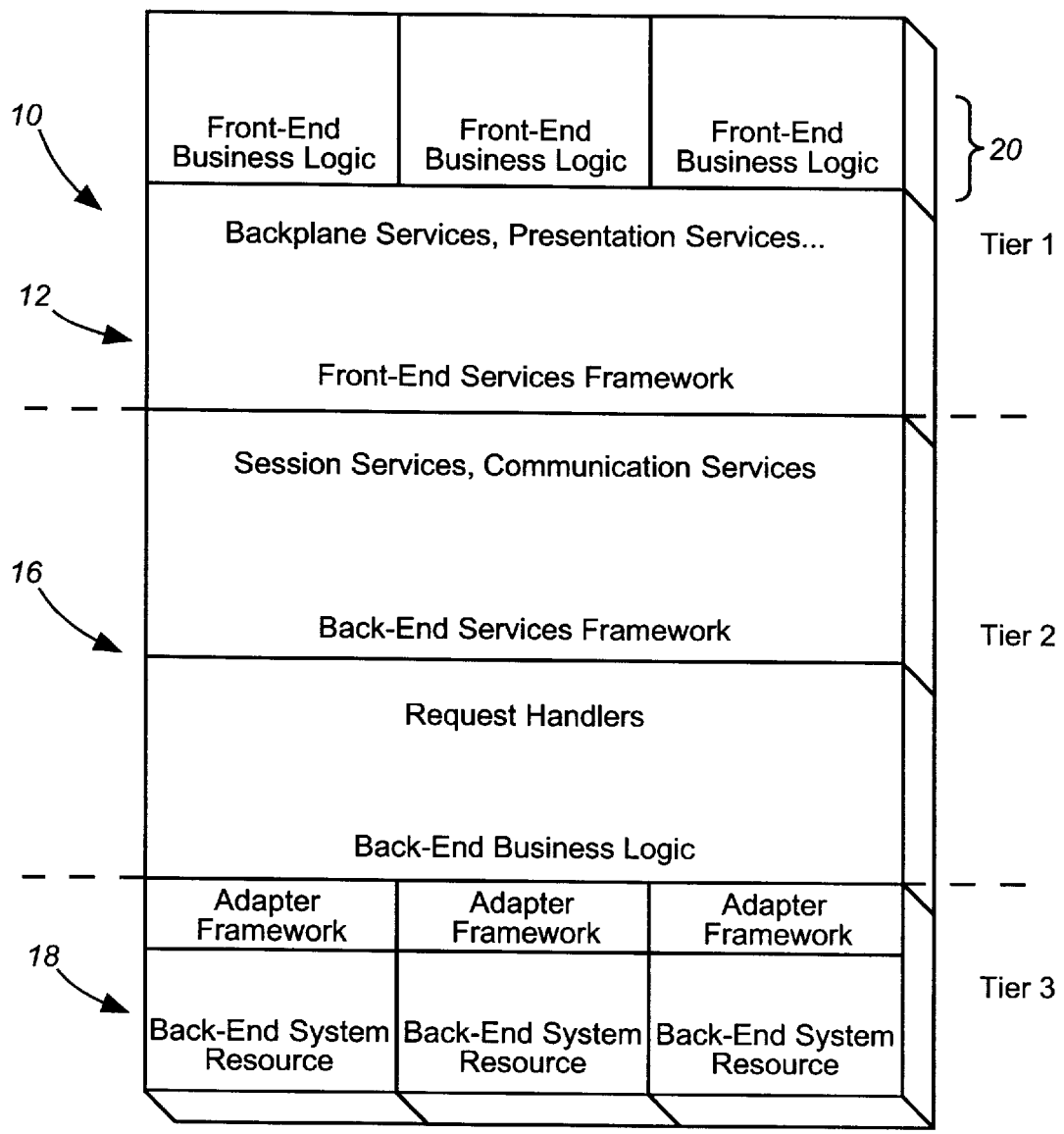
FIG. 1 illustrates the software architecture component comprising a three-tiered structure.

FIG. 1 is a diagrammatic illustration of the software architecture component in which the present invention functions. A first or client tier 10 of software services are resident on a customer workstation and provides customer access to the enterprise system, having one or more downloadable application objects directed to front-end business logic, one or more backplane service objects for managing sessions, one or more presentation services objects for the presentation of customer options and customer requested data in a browser recognizable format and a customer supplied browser for presentation of customer options and data to the customer and for Internet communications over the public Internet. Additional applications are directed to front-end services such as the presentation of data in the form of tables and charts, and data processing functions such as sorting and summarizing in a manner such that multiple programs are combined in a unified application suite.

A second or middle tier 16, is provided having secure web servers and back-end services to provide applications that establish user sessions, govern user authentication and their entitlements, and communicate with adaptor programs to simplify the interchange of data across the network.

A third or back-end tier 18 having applications directed to legacy back-end services including database storage and retrieval systems and one or more database servers for accessing system resources from one or more legacy hosts.

Generally, as explained in co-pending U.S. patent application Ser. No. 09/159,515, now U.S. Pat. No. 6,115,040, entitled GRAPHICAL USER INTERFACE FOR WEB ENABLED APPLICATIONS, the disclosure of which is incorporated herein by reference thereto, the customer workstation includes client software capable of providing a platform-independent, browser-based, consistent user interface implementing objects programmed to provide a reusable and common GUI abstraction and problem-domain abstractions. More specifically, the client-tier software is created and distributed as a set of Java classes including the applet classes to provide an industrial strength, object-oriented environment over the Internet. Application-specific classes are designed to support the functionality and server interfaces for each application with the functionality delivered through the system being of two-types: 1) cross-product, for example, inbox and reporting functions, and 2) product specific, for example, toll free network management or call management functions. The system is capable of delivering to customers the functionality appropriate to their product mix.

Figure 2:
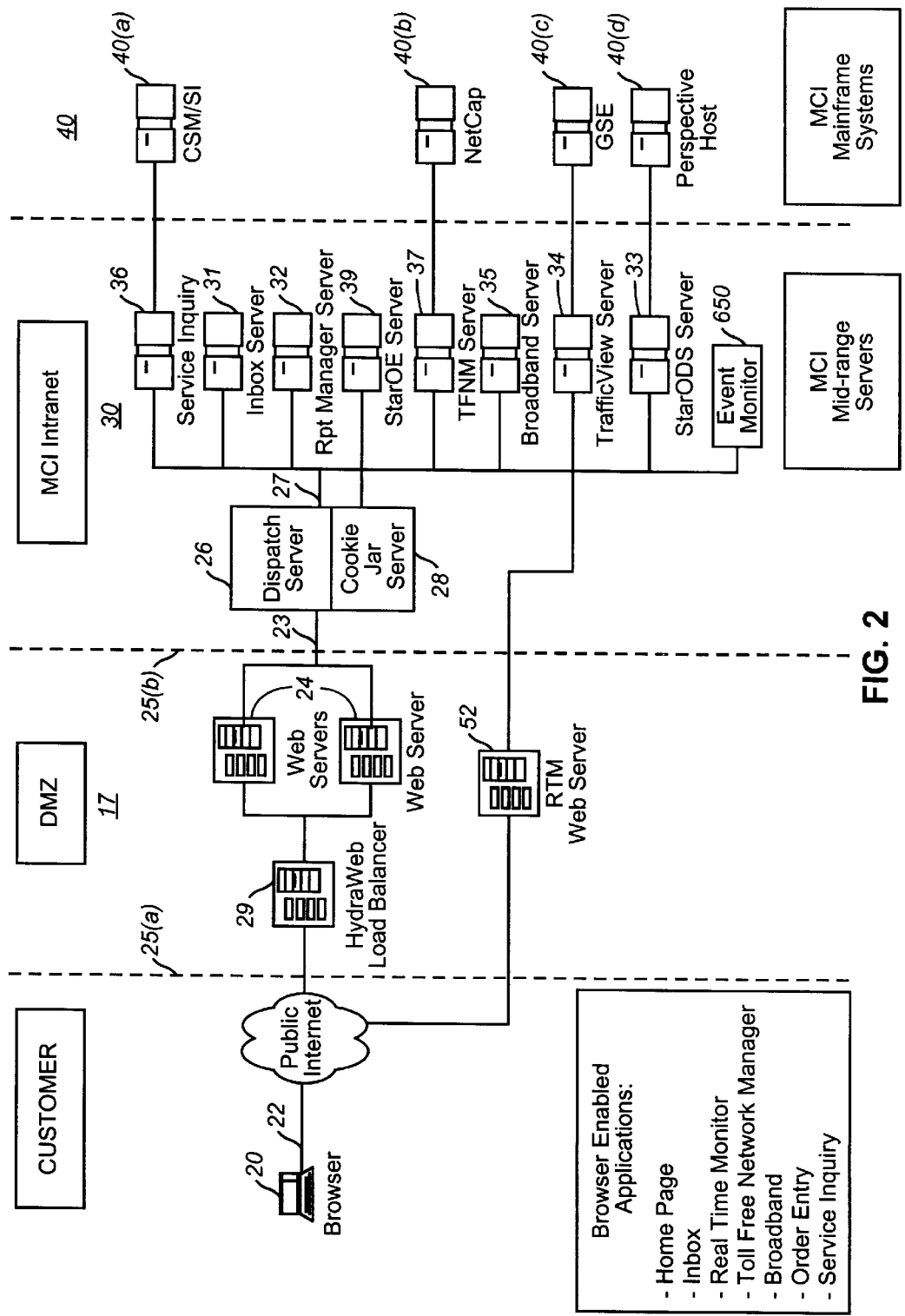
FIG. 2 is a diagrammatic overview of the software architecture of the networkMCI Interact system.

FIG. 2 is a diagrammatic overview of the software architecture of the networkMCI Interact system including: the Customer Browser (a.k.a. the Client) 20; the Demilitarized Zone (DMZ) 17 comprising a Web Servers cluster 24; the MCI Intranet Dispatcher Server 26; and the MCI Intranet Application servers 30, and the data warehouses legacy systems, etc. 40.

Figure 3:
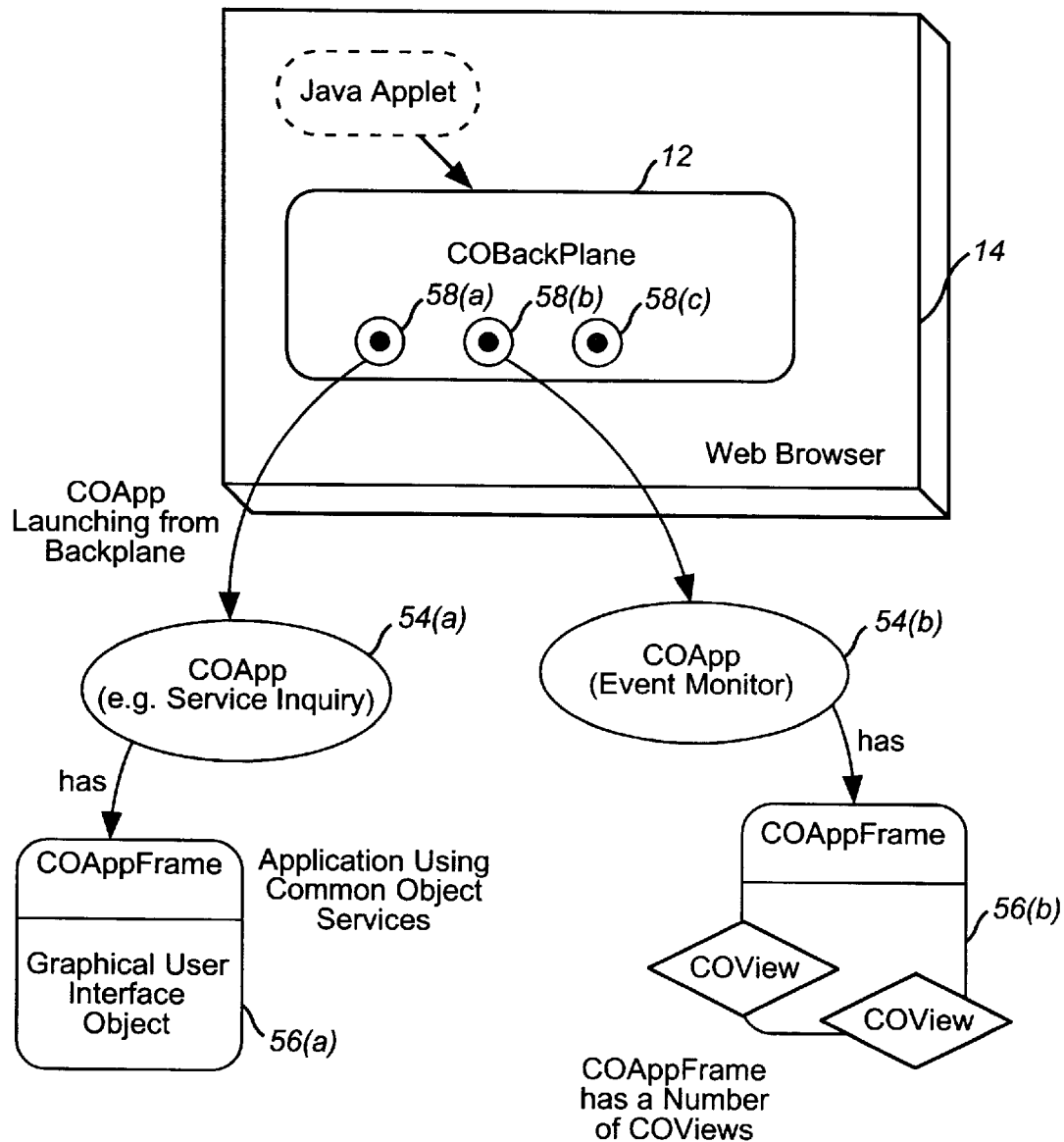
FIG. 3 is an illustrative example of a backplane architecture schematic viewed from a home page of the present invention.

The Customer Browser 20, is browser enabled and includes client applications responsible for presentation and front-end services. Its functions include providing a user interface to various MCI services and supporting communications with MCI's Intranet web server cluster 24. As illustrated in FIG. 3, and more specifically described in the above-mentioned, co-pending U.S. patent application Ser. No. 09/159,515, now U.S. Pat. No. 6,115,040, entitled GRAPHICAL USER INTERFACE FOR WEB ENABLED APPLICATIONS, the client tier software is responsible for presentation services to the customer and generally includes a web browser 14 and additional object-oriented programs residing in the client workstation platform 20. The client software is generally organized into a component architecture with each component generally comprising a specific application, providing an area of functionality. The applications generally are integrated using a "backplane" services layer 12 which provides a set of services to the application objects that provide the front-end business logic. The backplane services layer 12 also manages the launching of the application objects. The networkMCI Interact common set of objects provide a set of services to each of the applications. The set of services include: 1) session management; 2) application launch; 3) inter-application communications; 4) window navigation among applications; 5) log management; and 6) version management.

The primary common object services include: graphical user interface (GUI); communications; printing; user identity, authentication, and entitlements; data import and export; logging and statistics; error handling; and messaging services.

FIG. 3 is a diagrammatic example of a backplane architecture scheme illustrating the relationship among the common objects. In this example, the backplane services layer 12 is programmed as a Java applet which may be loaded and launched by the web browser 14. With reference to FIG. 3, a typical user session starts with a web browser 14 creating a backplane 12, after a successful logon. The backplane 12, inter alia, presents a user with an interface for networkMCI Interact application management. A typical user display provided by the backplane 12 may show a number of applications the user is entitled to run, each application represented by buttons depicted in FIG. 3 as buttons 58*a,b,c* selectable by the user. As illustrated in FIG. 3, upon selection of an application, the backplane 12 launches that specific application, for example, Service Inquiry 54*a* or Event Monitor 54*b*, by creating the application object. In processing its functions, each application in turn, may utilize common object services provided by the backplane 12. FIG. 3 shows graphical user interface objects 56*a,b* created and used by a respective application 54*a,b* for its own presentation purposes.

Figure 4:
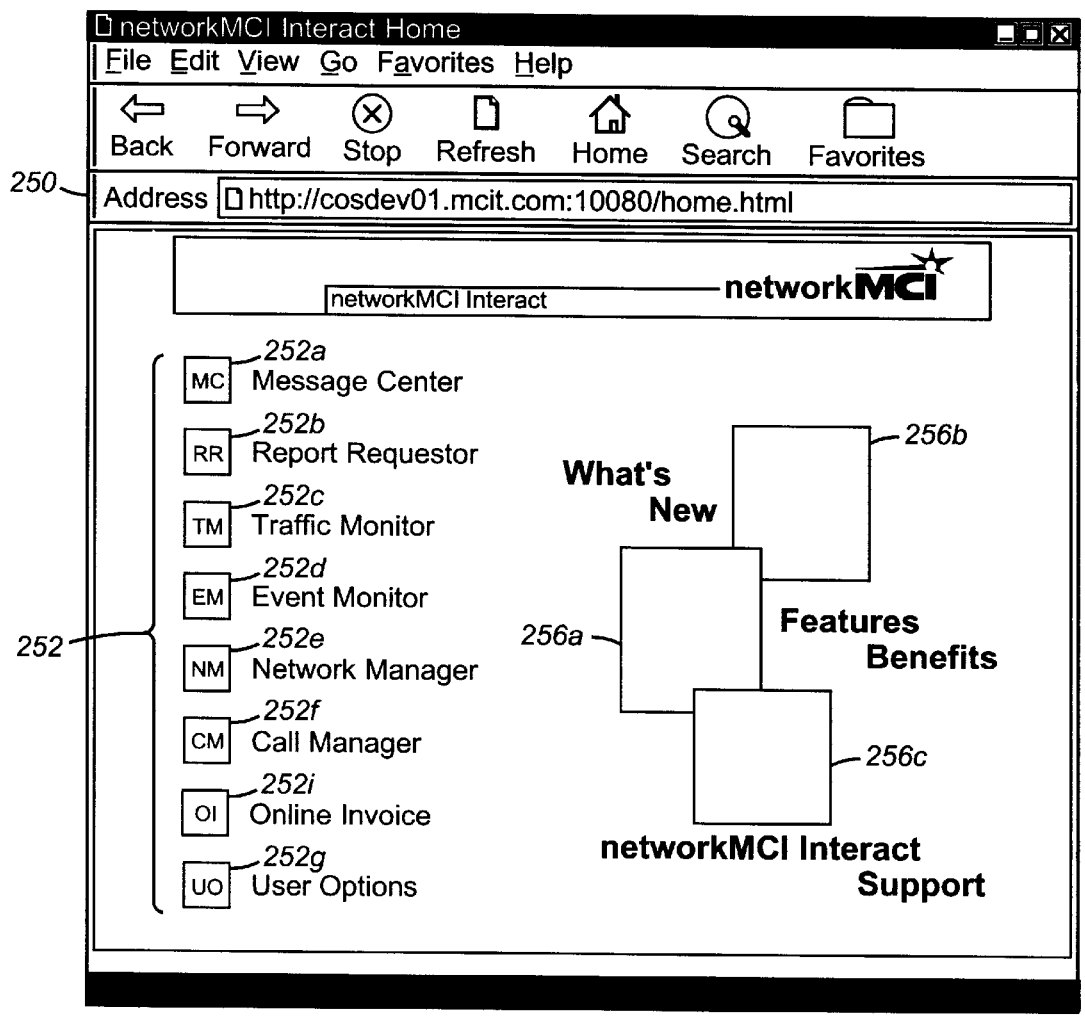
FIG. 4 illustrates an example client GUI presented to the client/customer as a browser web page.

FIG. 4 illustrates an example client GUI presented to the client/customer as a browser web page 250 providing, for example, a suite 252 of network management reporting applications including: MCI Traffic Monitor 252c; Call Manager 252f; a Network Manager 252e and Online Invoice 252i. Access to network functionality is also provided through Report Requester 252b, which provides a variety of detailed reports for the client/customer and a Message Center 252a for providing enhancements and functionality to traditional e-mail communications.

As shown in FIGS. 3 and 4, the browser resident GUI of the present invention implements a single object, COBackPlane which keeps track of all the client applications, and which has capabilities to start, stop, and provide references to any one of the client applications.

The backplane 12 and the client applications use a browser 14 such as the Microsoft Explorer versions 4.0.1 or higher for an access and distribution mechanism. Although the backplane is initiated with a browser 14, the client applications are generally isolated from the browser in that they typically present their user interfaces in a separate frame, rather than sitting inside a Web page.

The backplane architecture is implemented with several primary classes. These classes include COBackPlane, COApp, COAppImpl, COParm. and COAppFrame classes. COBackPlane 12 is an application backplane which launches the applications 54a, 54b, typically implemented as COApp. COBackPlane 12 is generally implemented as a Java applet and is launched by the Web browser 14. This backplane applet is responsible for launching and closing the COApps.

When the backplane is implemented as an applet, it overrides standard Applet methods init( ), start( ), stop( ) and run( ). In the init( ) method, the backplane applet obtains a COUser user context object. The COUser object holds information such as user profile, applications and their entitlements. The user's configuration and application entitlements provided in the COUser context are used to construct the application toolbar and Inbox applications. When an application toolbar icon is clicked, a particular COApp is launched by launchApp( ) method. The launched application then may use the backplane for inter-application communications, including retrieving Inbox data.

The COBackPlane 12 includes methods for providing a reference to a particular COApp, for interoperation. For example, the COBackPlane class provides a getApp( ) method which returns references to application objects by name. Once retrieved in this manner, the application object's public interface may be used directly.

The use of a set of common objects for implementing the various functions provided by the system of the present invention, and particularly the use of browser based objects to launch applications and pass data therebetween is more fully described in the above-referenced, co-pending application GRAPHICAL USER INTERFACE FOR WEB ENABLED APPLICATIONS.

As shown in FIG. 2, the aforesaid objects will communicate the data by establishing a secure TCP messaging session with one of the DMZ networkMCI Interact Web servers 24 via an Internet secure communications path 22 established, preferably, with a secure sockets SSL version of HTTPS. The DMZ networkMCI Interact Web servers 24 function to decrypt the client message, preferably via the SSL implementation, and unwrap the session key and verify the users session. After establishing that the request has come from a valid user and mapping the request to its associated session, the DMZ Web servers 24 re-encrypt the request using symmetric encryption and forward it over a second socket connection 23 to the dispatch server 26 inside the enterprise Intranet.

As described in greater detail in co-pending U.S. patent application No. 09/159,514, entitled SECURE CUSTOMER INTERFACE FOR WEB-BASED DATA MANAGEMENT, the contents and disclosure of which are incorporated by reference as if fully set forth herein, a networkMCI Interact session is designated by a logon, successful authentication, followed by use of server resources, and logoff. However, the world-wide web communications protocol uses HTTP, a stateless protocol, each HTTP request and reply is a separate TCP/IP connection, completely independent of all previous or future connections between the same server and client. The nMCI Interact system is implemented with a secure version of HTTP such as S-HTTP or HTTPS, and preferably utilizes the SSL implementation of HTTPS. The preferred embodiment uses SSL which provides a cipher spec message which provides server authentication during a session. The preferred embodiment further associates a given HTTPS request with a logical session which is initiated and tracked by a "cookie jar server" 28 to generate a "cookie" which is a unique server-generated key that is sent to the client along with each reply to a HTTPS request. The client holds the cookie and returns it to the server as part of each subsequent HTTPS request. As desired, either the Web servers 24, the cookie jar server 28 or the Dispatch Server 26, may maintain the "cookie jar" to map these keys to the associated session. A separate cookie jar server 28, as illustrated in FIG. 2 has been found desirable to minimize the load on the dispatch server 26. This form of session management also functions as an authentication of each HTTPS request, adding an additional level of security to the overall process.

As illustrated in FIG. 2, after one of the DMZ Web servers 24 decrypts and verifies the user session, it forwards the message through a firewall 25b over a TCP/IP connection 23 to the dispatch server 26 on a new TCP socket while the original socket 22 from the browser is blocking, waiting for a response. The dispatch server 26 unwraps an outer protocol layer of the message from the DMZ services cluster 24, and re-encrypts the message with symmetric encryption and forwards the message to an appropriate application proxy via a third TCP/IP socket 27. While waiting for the proxy response all three of the sockets 22, 23, 27 block on a receive. Specifically, once the message is decrypted, the wrappers are examined to reveal the user and the target middle-tier (Intranet application) service for the request. A first-level validation is performed, making sure that the user is entitled to communicate with the desired service. The user's entitlements in this regard are fetched by the dispatch server 26 from the StarOE server 49, the server component of the present invention, at logon time and cached.

If the requestor is authorized to communicate with the target service, the message is forwarded to the desired service's proxy. Each application proxy is an application specific daemon which resides on a specific Intranet server, shown in FIG. 2 as a suite of mid-range servers 30. Each Intranet application server of suite 30 is generally responsible for providing a specific back-end service requested by the client, and, is additionally capable of requesting services from other Intranet application servers by communicating to the specific proxy associated with that other application server. Thus, an application server not only can offer its browser a client to server interface through the proxy, but also may offer all its services from its proxy to other application servers. In effect, the application servers requesting services are acting as clients to the application servers providing the services. Such mechanism increases the security of the overall system as well as reducing the number of interfaces.

The network architecture of FIG. 2 may also include a variety of application specific proxies having associated Intranet application servers including: a StarOE proxy for the StarOE application server 39 for handling authentication order entry/billing; an Inbox proxy for the Inbox application server 31, which functions as a container for completed reports, call detail data and marketing news messages; a Report Manager proxy capable of communicating with a system-specific Report Manager server 32 for generation, management and receipt notification of customized reports; a Report Scheduler proxy for performing the scheduling and requests of the customized reports. The customized reports include, for example: call usage analysis information provided from the StarODS server 33; network traffic analysis/ monitor information provided from the Traffic view server 34; virtual data network alarms and performance reports provided by Broadband server 35; trouble tickets for switching, transmission and traffic faults provided by Service Inquiry server 36; and toll free routing information provided by Toll Free Network Manager server 37.

As partially shown in FIG. 2, it is understood that each Intranet server of suite 30 communicates with one or several consolidated network databases which include each customer's network management information and data. For example, the Services Inquiry server 36 includes communication with MCI's Customer Service Management legacy platform 40(a). Such network management and customer network data is additionally accessible by authorized MCI management personnel. As shown in FIG. 2, other legacy platforms 40(b), 40(c) and 40(d) may also communicate individually with the Intranet servers for servicing specific transactions initiated at the client browser. The illustrated legacy platforms 40(a)-(d) are illustrative only and it is understood other legacy platforms may be interpreted into the network architecture illustrated in FIG. 2 through an intermediate midrange server 30.

Each of the individual proxies may be maintained on the dispatch server 26, the related application server, or a separate proxy server situated between the dispatch server 26 and the midrange server 30. The relevant proxy waits for requests from an application client running on the customer's workstation 10 and then services the request, either by handling them internally or forwarding them to its associated Intranet application server 30. The proxies additionally receive appropriate responses back from an Intranet application server 30. Any data returned from the Intranet application server 30 is translated back to client format, and returned over the Internet to the client workstation 10 via the Dispatch Server 26 and at one of the web servers in the DMZ Services cluster 24 and a secure sockets connection. When the resultant response header and trailing application specific data are sent back to the client browser from the proxy, the messages will cascade all the way back to the browser 14 in real time, limited only by the transmission latency speed of the network.

The networkMCI Interact middle tier software includes a communications component offering three (3) types of data transport mechanisms: 1) Synchronous; 2) Asynchronous; and 3) Bulk transfer. Synchronous transaction is used for situations in which data will be returned by the application server 40 quickly. Thus, a single TCP connection will be made and kept open until the full response has been retrieved.

Asynchronous transaction is supported generally for situations in which there may be a long delay in application server 40 response. Specifically, a proxy will accept a request from a customer or client 10 via an SSL connection and then respond to the client 10 with a unique identifier and close the socket connection. The client 10 may then poll repeatedly on a periodic basis until the response is ready. Each poll will occur on a new socket connection to the proxy, and the proxy will either respond with the resultant data or, respond that the request is still in progress. This will reduce the number of resource consuming TCP connections open at any time and permit a user to close their browser or disconnect a modem and return later to check for results.

Bulk transfer is generally intended for large data transfers and are unlimited in size. Bulk transfer permits cancellation during a transfer and allows the programmer to code resumption of a transfer at a later point in time.

Figure 5:
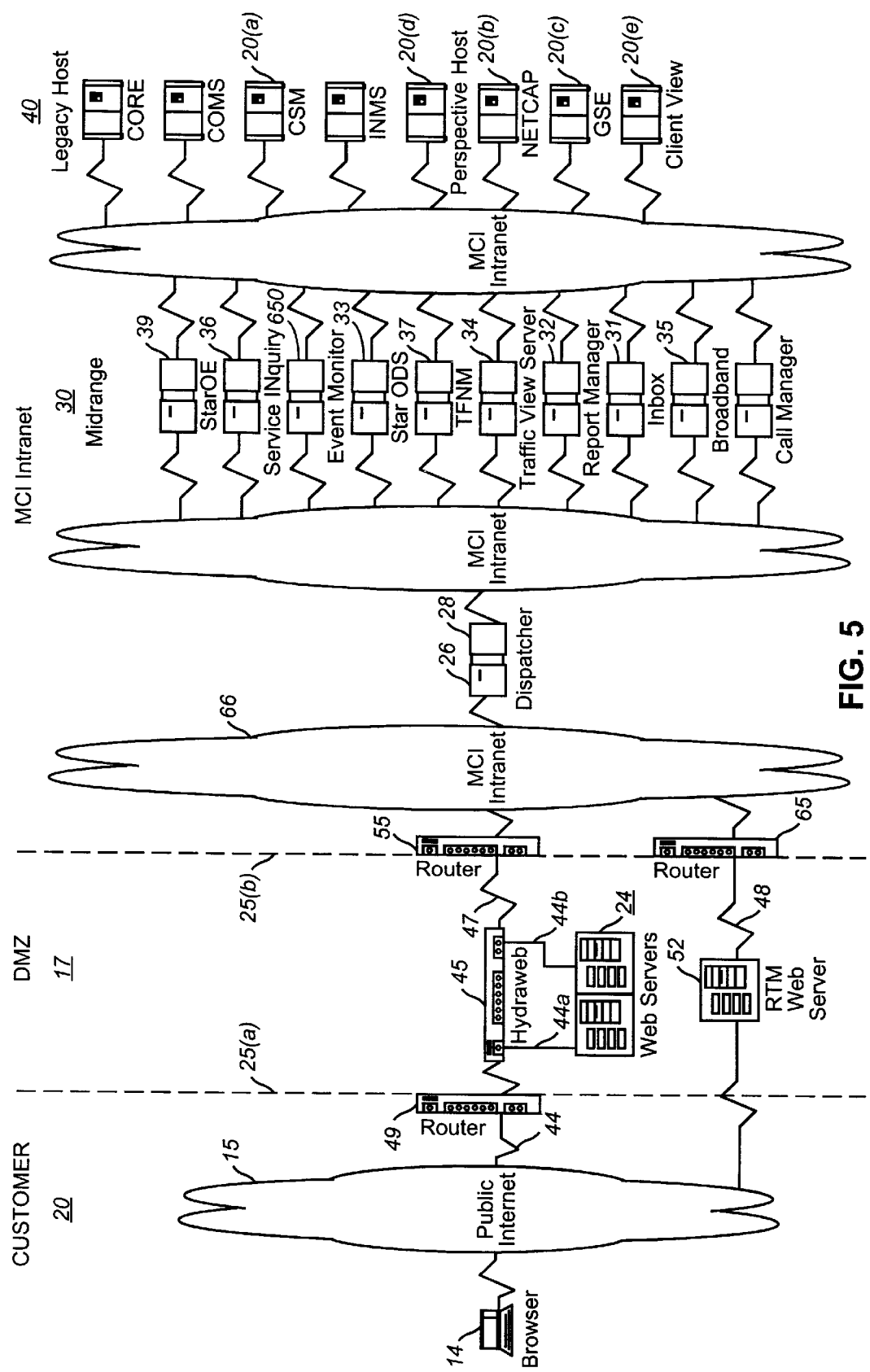
FIG. 5 is a diagram depicting the physical networkMCI Interact system architecture.

FIG. 5 is a diagram depicting the physical networkMCI Interact system architecture 10. As shown in FIG. 5, the system is divided into three major architectural divisions including: 1) the customer workstation 20 which include those mechanisms enabling customer connection to the Secure web servers 24; 2) a secure network area 17, known as the demilitarized Zone "DMZ" set aside on MCI premises double firewalled between the both the public Internet 25 and the MCI Intranet to prevent potentially hostile customer attacks; and, 3) the MCI Intranet Midrange Servers 30 and Legacy Mainframe Systems 40 which comprise the back-end business logic applications.

As illustrated in FIG. 5, the present invention includes a double or complex firewall system that creates a "demilitarized zone" (DMZ) between two firewalls 25a, 25b. In the preferred embodiment, one of the firewalls 29 includes port specific filtering routers, which may only connect with a designated port on a dispatch server within the DMZ. The dispatch server connects with an authentication server, and through a proxy firewall to the application servers. This ensures that even if a remote user ID and password are hijacked, the only access granted is to one of the web servers 24 or to intermediate data and privileges authorized for that user. Further, the hijacker may not directly connect to any enterprise server in the enterprise intranet, thus ensuring internal company system security and integrity. Even with a stolen password, the hijacker may not connect to other ports, root directories or applications within the enterprise system.

The DMZ acts as a double firewall for the enterprise intranet because the web servers located in the DMZ never store or compute actual customer sensitive data. The web servers only put the data into a form suitable for display by the customer's web browser. Since the DMZ web servers do not store customer data, there is a much smaller chance of any customer information being jeopardized in case of a security breach.

As previously described, the customer access mechanism is a client workstation 20 employing a Web browser 14 for providing the access to the networkMCI Interact system via the public Internet 15. When a subscriber connects to the networkMCI Interact Web site by entering the appropriate URL, a secure TCP/IP communications link 22 is established to one of several Web servers 24 located inside a first firewall 25a in the DMZ 17. Preferably at least two web servers are provided for redundancy and failover capability. In the preferred embodiment of the invention, the system employs SSL encryption so that communications in both directions between the subscriber and the networkMCI Interact system are secure.

In the preferred embodiment, all DMZ Secure Web servers 24 are preferably DEC 4100 systems having Unix or NT-based operating systems for running services such as HTTPS, FTP, and Telnet over TCP/IP. The web servers may interconnected by a fast Ethernet LAN running at 100

Mbit/sec or greater, preferably with the deployment of switches within the Ethernet LANs for improved bandwidth utilization. One such switching unit included as part of the network architecture is a HydraWEB™ unit 45, manufactured by HydraWEB Technologies, Inc., which provides the DMZ with a virtual IP address so that subscriber HTTPS requests received over the Internet will always be received. The HydraWEB™ unit 45 implements a load balancing algorithm enabling intelligent packet routing and providing optimal reliability and performance by guaranteeing accessibility to the "most available" server. It particularly monitors all aspects of web server health from CPU usage, to memory utilization, to available swap space so that Internet/Intranet networks can increase their hit rate and reduce Web server management costs. In this manner, resource utilization is maximized and bandwidth (throughput) is improved. It should be understood that a redundant HydraWEB™ unit may be implemented in a Hot/Standby configuration with heartbeat messaging between the two units (not shown). Moreover, the networkMCI Interact system architecture affords web server scaling, both in vertical and horizontal directions. Additionally, the architecture is such that new secure web servers 24 may be easily added as customer requirements and usage increases. The use of the HydraWEB™ enables better load distribution when needed to match performance requirements.

As shown in FIG. 5, the most available Web server 24 receives subscriber HTTPS requests, for example, from the HydraWEB™ 45 over a connection 44a and generates the appropriate encrypted messages for routing the request to the appropriate MCI Intranet midrange web server over connection 44b, router 55 and connection 23. Via the HydraWEB™ unit 45, a TCP/IP connection 38 links the Secure Web server 24 with the MCI Intranet Dispatcher server 26.

Further as shown in the DMZ 17 is a second RTM server 52 having its own connection to the public Internet via a TCP/IP connection 48. As described in co-pending U.S. patent application Ser. No. 09/159,516, entitled INTEGRATED PROXY INTERFACE FOR WEB BASED TELECOMMUNICATIONS MANAGEMENT TOOLS, incorporated by reference as if fully set forth herein, this RTM server provides real-time session management for subscribers of the networkMCI Interact Real Time Monitoring system. An additional TCP/IP connection 48 links the RTM Web server 52 with the MCI Intranet Dispatcher server 26.

With more particularity, as further shown in FIG. 5, the networkMCI Interact physical architecture includes three routers: a first router 49 for routing encrypted messages from the Public Internet 15 to the HydraWEB™ 45 over a socket connection 44; a second router 55 for routing encrypted subscriber messages from a Secure Web server 24 to the Dispatcher server 26 located inside the second firewall 25b; and, a third router 65 for routing encrypted subscriber messages from the RTM Web server 52 to the Dispatcher server 26 inside the second firewall. Although not shown, each of the routers 55, 65 may additionally route signals through a series of other routers before eventually being routed to the nMCI Interact Dispatcher server 26. In operation, each of the Secure servers 24 function to decrypt the client message, preferably via the SSL implementation, and unwrap the session key and verify the users session from the COUser object authenticated at Logon.

After establishing that the request has come from a valid user and mapping the request to its associated session, the Secure Web servers 24 will re-encrypt the request using symmetric RSA encryption and forward it over a second secure socket connection 23 to the dispatch server 26 inside the enterprise Intranet.

As described herein, and in greater detail in co-pending U.S. patent application Ser. No. 09/159,695, the data architecture component of networkMCI Interact reporting system is focused on the presentation of real time (un-priced) call detail data, such as provided by MCI's TrafficView Server 34, and priced call detail data and reports, such as provided by MCI's StarODS Server 33 in a variety of user selected formats. simultaneously. For example, the spreadsheet presentation allows for sorting by any arbitrary set of columns. The report viewer may also be launched from the inbox when a report is selected.

A common database may be maintained to hold the common configuration data which may be used by the GUI applications and by the mid-range servers. Such common data includes but are not limited to: customer security profiles, billing hierarchies for each customer, general reference data (states, NPA's, Country codes), and customer specific pick lists: e.g., ANI's, calling cards, etc. An MCI Internet StarOE server manages the data base for the common configuration of data.

Report management related data is also generated which includes 1) report profiles defining the types of reports that are available, fields for the reports, default sort options and customizations allowed; and 2) report requests defining customer specific report requests including report type, report name, scheduling criteria, and subtotal fields. This type of data is typically resident in a Report Manager server database and managed by the report manager.

The Infrastructure component of the nMCI Reporting system includes mechanisms for providing secure communications regardless of the data content being communicated. As described in detail in above-referenced, co-pending U.S. patent application Ser. No. 09/159,154, the nMCI Interact system security infrastructure includes: 1) authentication, including the use of passwords and digital certificates; 2) public key encryption, such as employed by a secure sockets layer (SSL) encryption protocol; 3) firewalls, such as described above with reference to the network architecture component; and 4) non-repudiation techniques to guarantee that a message originating from a source is the actual identified sender. One technique employed to combat repudiation includes use of an audit trail with electronically signed one-way message digests included with each transaction.

Another component of the nMCI Interact infrastructure includes order entry, which is supported by the present invention, the Order Entry ("StarOE") service. The general categories of features to be ordered include: 1) Priced Reporting; 2) Real-time reporting; 3) Priced Call Detail; 4) Real Time Call Detail; 5) Broadband SNMP Alarming; 6) Broadband Reports; 7) Inbound RTM; 8) Outbound RTM; 9) Toll Free Network Manager; and 10) Call Manager. The order entry functionality is extended to additionally support 11) Event Monitor; 12) Service Inquiry; 13) Outbound Network Manager; and, 14) Online invoicing.

The self-monitoring infrastructure component for nMCI Interact is the employment of mid-range servers that support SNMP alerts at the hardware level. In addition, all software processes must generate alerts based on process health, connectivity, and availability of resources (e.g., disk usage, CPU utilization, database availability).

The Metrics infrastructure component for nMCI Interact is the employment of mechanisms to monitor throughput and volumes at the Web servers, dispatcher server, application proxies and mid-range servers. Metrics monitoring helps in the determination of hardware and network growth.

To provide the areas of functionality described above, the client tier 10 is organized into a component architecture, with each component providing one of the areas of functionality. As explained in further detail in co-pending U.S. patent application Ser. No. 09/159,515, now U.S. Pat. No. 6,115,040, the client-tier software is organized into a "component" architecture supporting such applications as inbox fetch and inbox management, report viewer and report requester, TFNM, Event Monitor, Broadband, Real-Time Monitor, and system administration applications. Further functionality integrated into the software architecture includes applications such as Outbound Network Manager, Call Manager, Service Inquiry and Online invoicing.

Event monitor

The present invention is directed to an event monitor tool for enabling customers to monitor, over the Internet or a company Intranet, their dedicated voice and data circuits. A Web-based user-friendly interface presents network alarms on degraded or broken circuits and provides network performance and alarm information, thereby effectively increasing the efficiency of troubleshooting and allowing customers to make informed network management decisions.

More specifically, the present invention gives customers the ability to: exercise alarm management from a single workstation, the management including, triggering the alarms and clearing the events; acknowledge or recognize new alarm conditions as they occur; receive notification of fiber outages that impact their data circuits; define or display customized troubleshooting procedures for specific alarm or circuits; access a comprehensive database of their dedicated voice and data circuits; display or print lists of active alarms; define or display customized alarm filters to specify which alarms will appear in the alarm presentation; and generate reports about network performance.

Figure 6:
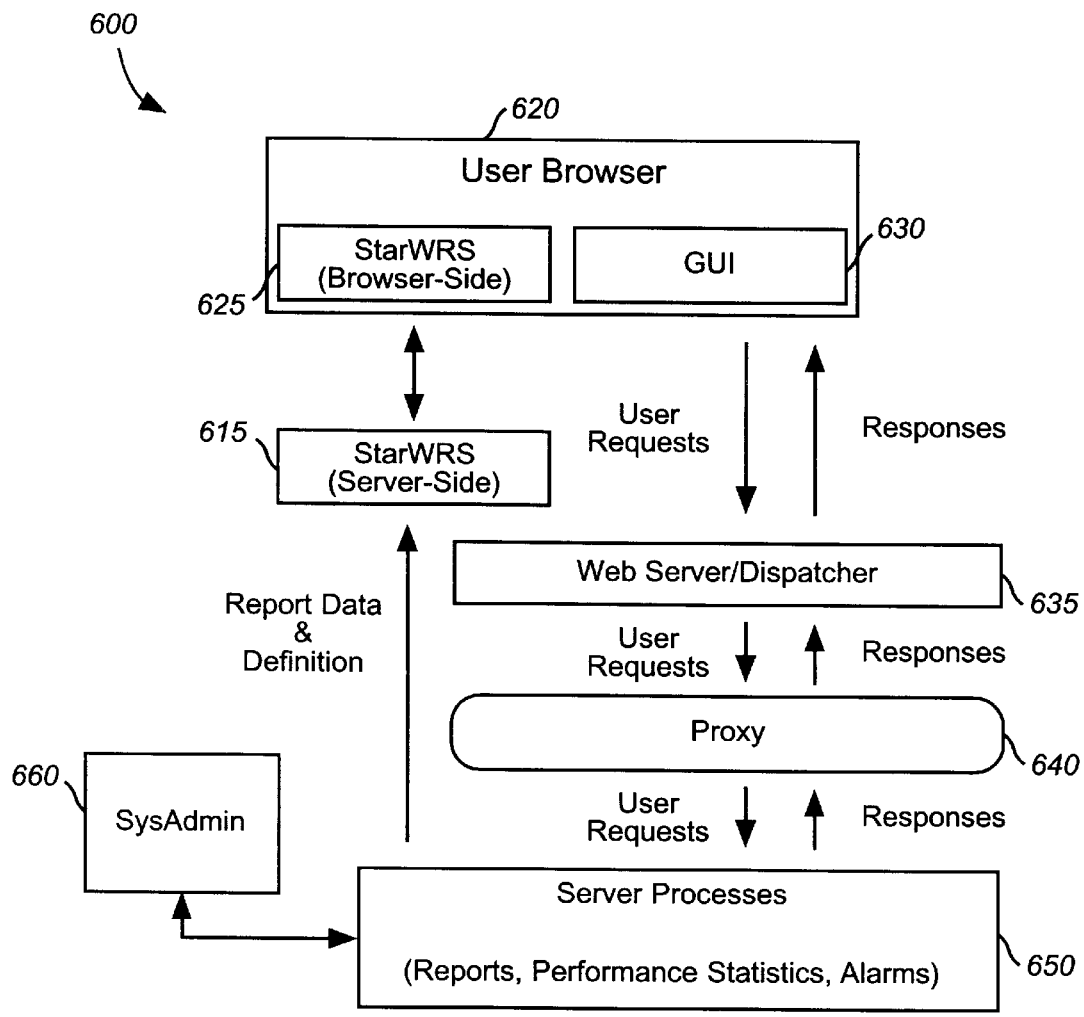
FIG. 6 is a block diagram illustrating an event monitor architecture overview.

A general block diagram illustrating the event monitor system architecture 600 is shown in FIG. 6. In accordance with the invention, a first component includes a user web browser 620, e.g., Internet Explorer® 4.0, employing an event monitor GUI 630 enabling the generation of requests and receipt of responses from various event monitor system server processes 650 over the Web/Internet via a secure socket connection for presentation of event monitor's alarms and reports. A second component may include a report viewer and requestor processes 625 which are part of a "networkMCI Interact" Reporting System 615, 625 such as described in co-pending U.S. patent application Ser. No. 09/159,409, the contents and disclosure of which are incorporated by reference herein, and which provides the support for generating and presenting reports relating to the conditions of the customer's dedicated voice and data networks.

The "networkMCI Interact" system particularly employs corresponding server side reporting component 615 having the above mentioned inbox, report scheduler and report manager components, in addition to alarm and report viewer and requester components implementing Java applets having viewer classes that enable the downloading and display of performance reports generated from event monitor server processes 650. In the preferred embodiment, the viewer classes provide the following types of network alarms on dedicated circuits that carry the following service types: inbound services, e.g., toll free and 900 numbers; outbound services, e.g., Vnet/Vision, and PRISM; and data services such as TDS 1.5. The circuit types for which the present invention presents network alarms include: dedicated access lines such as DALs; TDS 1.5 circuits; TDS45 circuits, DDS/DSO point to point circuits; ISDN DALS; and SW 56 DALs. In addition, the event monitor reporting feature enables customers to review alarm data over a period of time by creating and saving reports. The reports which may be generated include alarm summary, alarm detail, alarm duration, data circuit performance, and DAL performance. The alarm and performance reporting scheme effectually allows the customers to perform alarm trending and analysis, and to correlate alarm occurrences to network availability, network performance and problem resolution. Reports for fault reporting may be requested through the report requestor, a component of StarWRS, and the inbox. Recurring reports may be requested on a timely basis, e.g., hourly, daily, weekly, and monthly. Moreover, through the report requester, a user may specify whether the user should be paged or e-mailed when a report is in the inbox.

Also shown as part of the event monitor system architecture 600 of FIG. 6 is a web server/dispatcher component 635 which provides for the transport between the web browser and an event monitor proxy interface including all authentication and encryption. Thus, secure communication from the customer browser to a DMZ web server is enabled over a first TCP/IP socket connection, such as SSL, and communication from the DMZ web server over an enterprise firewall to the dispatcher server is enabled over a second TCP/IP socket connection. These secure paths enable customer requests and server responses to be communicated from the client browser to the event monitor server 650.

Specifically, the dispatcher forwards user requests to the event monitor server process 650 that employs an integrated proxy application 640 for receiving and interpreting the user messages and enabling the event monitor functionality. This proxy capability includes a multithreaded engine enabling multiple, simultaneously executing sessions supporting anticipated user load. The interface between the dispatcher server 635 and the event monitor proxy process 640 is also message-based, e.g., employing TCP/IP socket transport, and, as will be described, a defined messaging protocol which includes a generic message header followed by proxy-specific data. In the other direction, the same process is employed, i.e., the event monitor proxy 640 sends the generic header followed by the proxy-specific response back to the dispatch server 635 for communication over the firewall (not shown) and back to the user browser 620.

In the embodiment shown in FIG. 6, the necessary CSV data files and report definition metadata files may be downloaded to StarWRS component 615 and particularly to an inbox messaging server for subsequent access. It should be understood, however, that all event monitor responses including CSV data files and report definition metadata files are forwarded through the dispatcher and intervening DMZ web servers for eventual display at the client. Additionally, the event monitor may return a report object of variable length which includes the report data to be displayed at the client workstation.

In a preferred embodiment, the event monitor server 650 performs the various database queries and function calls in response to requests received from the customer via the event monitor proxy 640. Particularly, the event monitor server 650 is responsible for all tasks leading up to and including the management of alarms and performance reports including data collection, calculation, storage, and report generation.

In operation, the event monitor server 650 supports communication with a system administration ("StarOE") component 660 which provides order entry functions including functionality necessary to manage (create, update, delete) event monitor users, and allows for a feed of the appropriate order entry information to the event monitor server in order to properly associate the appropriate event monitor functionality and data to the right customer once given admission to the event monitor service. The StarOE order entry process essentially provides the mechanisms for authenticating users, and supplying entitlement information. A messaging interface is provided between StarOE 660 to the event monitor server 650 functioning as a client to receive authentication information including logon user identifiers which are supplied in response to launch of the event monitor GUI applet 630. The billing identifiers and levels of services, including the specific entitlement information are supplied from StarOE 660 to the event monitor server 650 via flat files which may be generated daily.

From the back-end legacy host, the event monitor server 650 receives statistics on voice (DAL) and data (TDS 1.5) services for providing its functionality to the event monitor users. The DALs are groups of dedicated 64K circuits that carry voice traffic to and from a customer's premise terminating equipment, i.e., PBX, to a telecommunication service provider's switch. A TDS 1.5 data circuit is a dedicated point-to-point circuit that spans from one customer location directly to another. The data circuit includes at least two monitoring units, called Extended Superframe Monitoring Units(ESFMUs or ESF Cards), which generate alarms and collect statistics on the performance of the circuit. Alarms are presented near real-time and indicate that there is a failure associated with the data circuit. Performance statistics are compiled in 15-minute intervals and are used to derive performance alarms that provide the users with the indication that their network performance is degraded before the problem becomes service impacting.

Performance statistics are compared against pre-set performance parameters and deviations from these parameters are recorded. When a given threshold is exceeded, alarms are generated and notification is sent to the customers such that the customers may then view alarms and take necessary steps to correct the problem. The performance parameters and thresholds may be modifiable via the event monitor GUI applet 630 by those customers having proper access level entitlements as verified by the StarOE 660. Each of the components shown in FIG. 6 and their respective processes will be described in further detail herein.

Event Monitor GUI Client Application

All alarms and reports for event monitor are typically accessible via the "networkMCI Interact" alarming and reporting structure established within the home page (FIG. 4). Event monitor alarms are viewed via an alarm monitoring system in which both broadband and event monitor alarms may appear. The event monitor GUI client application is typically launched via the event monitor icon 252*d* on the home page (FIG. 4). Reports for fault reporting may be requested through the report requestor 252*b*, a component of StarWRS, and the inbox 252*a*.

In the preferred embodiment, the event monitor GUI client application is provided as a launching pad for accessing all the event monitor services. The event monitor GUI client application is itself launched by selecting the event monitor icon 252*d* from the "networkMCI Interact" home page (FIG. 4). The event monitor GUI client application provides a menu bar, toolbar, and status bar for accessing event monitor services depending on the customer's service subscriptions. Event monitor service availability is determined by user logon session with StarOE server 660. If the user is not entitled or does not have authorization for a particular service, the corresponding toolbar icon or menu item is disabled. Thus, in accordance with the customer service option, the corresponding service icon and/or menu item is not activated and would not respond to a user input.

In providing its basic services, the event monitor display applet may have the responsibility of: 1) requesting reports that are no longer on the inbox server to be retrieved from a report data archive if a predetermined period of time has elapsed, e.g., 45 days, and provide these reports to the customer via the inbox; 2) defining alarm thresholds and parameters and trouble shooting procedures; 3) defining how the customer reports should be requested, e.g., report id, date, etc.; 4) providing on-line context sensitive help for all aspects of the event monitor web-based application; 5) providing the ability to spawn separate dialog windows, for example, to explain reporting activity in progress; and 6) providing access to custom reporting capability via the toolbar and menu.

In the preferred embodiment, the event monitor GUI application is implemented in Java to ensure platform independence and particularly is developed using many of the networkMCI Interact's common objects described in the co-pending U.S. application Ser. No. 09/159,515, now U.S. Pat. No. 6,115,040, and fully incorporated herein, for achieving interoperability with the application backplane. Specifically, the event monitor GUI application's startup code implements the COApp class, typically derived from the CoAppImpl interface. COApp provides an applet-like interface and includes applet methods such as getImage( ) and getAppletContext( ) and allows Java applet prototypes to be easily converted to COApps. The Event monitor GUI application, via the COApp, may create its own display space and present its user interface in a separate frame by having the space in one or more COAppFrame windows. The COAppFrame class and its COStdAppFrame subclass are wrappers for the Java Frame class which provide COApps with standard look-and-feel elements and implement some standard behavior, such as participating in COBackPlane's window management functions. The COAppFrame is a desktop window, separate from the browser. It presents the user with a preset layout of a menu, toolbar, status bar, enterprise logo, an application icon, etc., and a main viewing area. Since a separate frame does not need to be located inside a Web page, a concurrent (side-by-side) access to more than one networkMCI Interact application service is possible.

In another embodiment, the event monitor GUI application's startup code may be implemented using the COApplet class. The COApplet class extends the Applet class and may be launched by the browser from an HTML <Applet>tag. The CoApplet class is useful in cases where more isolation from the networkMCI Interact's platform is desired, or an application needs its own browser-based display space. The COApplet class implements most of the COApp interface by forwarding it to a contained COAppImpl object.

For determining the user's event monitor service options, the GUI client application requests and retrieves user profiles including the user entitlements from an event monitor customer database populated by a periodic feed (e.g., on a daily basis) from StarOE 660 (FIG. 6).

From the event monitor GUI client application, an alarm management object is also launched upon initialization of the GUI client application. The alarm management object essentially creates a blank user interface and starts a thread to handle communications with the event monitor server for events or alarms. The alarm thread is created to run periodically, e.g., every two minutes. Specifically, the AlarmThread invokes a COAsynchronousTransaction with the web server to poll for current event monitor alarms. When the AlarmThread receives the data back from the web server, it creates a command to update the display and executes the command.

The event monitor alarms are generally grouped into two categories: voice alarms and data circuit alarms, including broadband and SNMP alarms. Voice alarms are further divided into two types: service outage alarms which are generated when a percentage of circuits in a trunk group are not available to complete calls; and traffic alarms which are generated when a percentage of DALs reach a predefined percentage for blockage, terminating failure rates and originating failure rates. Traffic alarms are based on data accumulated for five or thirty minute intervals. Data alarms are divided into two types: service affecting alarms which are typically generated in instances where the service cannot be used because there is a loss of signal, unframed signal or equipment failure; and performance affecting alarms which are generated when high error rates are received for ten seconds or more, out-of-frame conditions occur or frame slips exist but service is still available. A drill down view depicting each alarm down to the individual circuit is available via the GUI as will be described below.

Reporting Functionality

As described above, the existing and new event monitor reports may be requested via the report requestor, a component of StarWRS. The reports are then posted in the inbox. Customers typically view the reports by launching the report viewer applet, another component of StarWRS. Once the report is made available, at the customer's preference and selection based on priorities and severity, the customers may receive notification through one or any combination of page, e-mail, or fax in addition to the display option of the notification on the customer's inbox. For example, a customer may choose to receive page and e-mail notification on all level 1 severity alarms and just display notifications in the inbox for level 2 severity alarms, etc.

Recurring reports may also be created by the user to run on a timely basis, e.g., hourly, daily, weekly, and monthly, as well as ad hoc (one time) reports. For example, a customer may have a standard DAL performance report delivered on a daily basis, and on a particular day, the same customer may choose to submit an ad hoc DAL performance report for any given interval, i.e., previous hour, previous several hours or days.

In addition, the event monitor may provide the ability to drill down within customer's premise equipment to view a breakdown of the customer's equipment and the ability to monitor performance and report alarms on individual channels within each circuit. Giving customers the capability to create and save a variety of reports and graphical views allows them to perform customized trending and analysis for maintaining better control and problem resolution schemes during their network management process.

Moreover, the event monitor presents via the report viewer applet, the map of the continental U.S. (World for global customers/services) for purposes of displaying the configuration of a customer's network. The customer may view their sites, the various connections between any two or more of these sites, and information about each specific site and circuit. The topographical mapping display allows customers to see a logical depiction of their network. The ability to drill down into individual sites, nodes and circuits are also available via the viewer applet. For example, if a customer has a circuit between New York and Los Angeles the highest level of the map shown may be the two locations on either end as well as the circuit between them. If a customer clicks on the circuit itself, raw data pertaining to the current throughput of that circuit or any alarm conditions that exist on the circuit may be displayed. Additionally, if the customer clicks on either of the two locations, further drill down for logical design layout of the customer premise equipment, such as a DSU or CSU, may be enabled. Furthermore, if alarms are present for that particular site, the drill down view may depict each alarm down to the individual circuit on a 24 channel T-1.

Another type of reporting service provided by the event monitor is called an integrated management services bouncing busy intervals report. This report provides a picture of a DAL group during its busiest time of the day by reporting statistics for the current or one of the previous 7 days at the busiest interval. The busiest interval is defined to be the 30-minute or 60-minute time period in which total usage was at the highest point. Other reports which may be obtained through the event monitor include: monitoring and performance reporting of individual DS3 and OC3 circuits, IDSN channels, International voice or data point-to-point private lines, E1 lines; and trunk utilization reports.

Alarming Functionality

The event monitor presents all detected alarms to the customer automatically, without the customer's intervention. The detected alarms within the event monitor are sent to the customers' inbox for spreadsheet display for on-line reviews. All current alarms are retrieved by the customer's web browser GUI applet using polling techniques at session initiation. Customers may define a period of time during which their alarms remain in current status, allowing non-current alarms to be deleted.

In addition to providing alarm notifications to customers, the event monitor may also provide a scheme in which a pre-defined trouble shooting procedure, modifiable by a customer, is launched automatically when an alarm is detected. For example, if an alarm is generated regarding a fiber outage that impacts a customer's toll free circuit, an option allows the user to go directly from the alarm message in the inbox to the appropriate alternate routing plan. In order to integrate two services, i.e., event monitor with toll free network manager (TFNM), the event monitor key data and alarm are communicated to allow TFNM to find the appropriate routing plan associated with the outage. The key data may include: toll free number, service id, circuit id, and type of service, e.g., toll free or broadband. The TFNM application is typically launched directly from an alarm view with the above parameters for finding the associated routing plan. User profile information needed by TFNM for authentication and entitlement verification before actually proceeding with the alternate routing plan, are also passed as parameters to the TFNM application at the same time.

Performance Metrics

The event monitor follows and conforms to general "networkMCI Interact" reporting standards in order to provide a consistent and common interface to the customers. Weekly reports do not have to be on a calendar week and may cover any consecutive 7 days. Monthly reports are, unlike the weekly reports, calendar based and are defined to cover the entire month. Ad-hoc reports are reports outside the pre-selected reporting structure and are typically available to customers within two minutes from the point of request by customers.

In a preferred embodiment, the event monitor alarms are typically distinguished into two types: event-based alarms, and statistical alarms. Event-based alarms are alarms generated on the physical connection between the customers CSU/DSU circuits and the telecommunication service provider's switches, e.g., alarms occurring due to a loss or bring-down of a circuit. In addition, the customer may specify this notification to be sent as a page, fax, or e-mail. In these cases, the notification is sent within the required 30-second window from the moment the alarm is detected by the event monitor.

Statistical alarms are alarms generated due to the percentage of down time or of other statistical nature. Statistical alarms depend on the frequency at which the customer's web browser is polled, e.g., 2–4 minute intervals. Once polling is established and an alarm is detected, the time-to-deliver notification of the alarm is similar to the event-based alarms, i.e., within 30 seconds.

The Event Monitor Back-end Configuration

Figure 7:
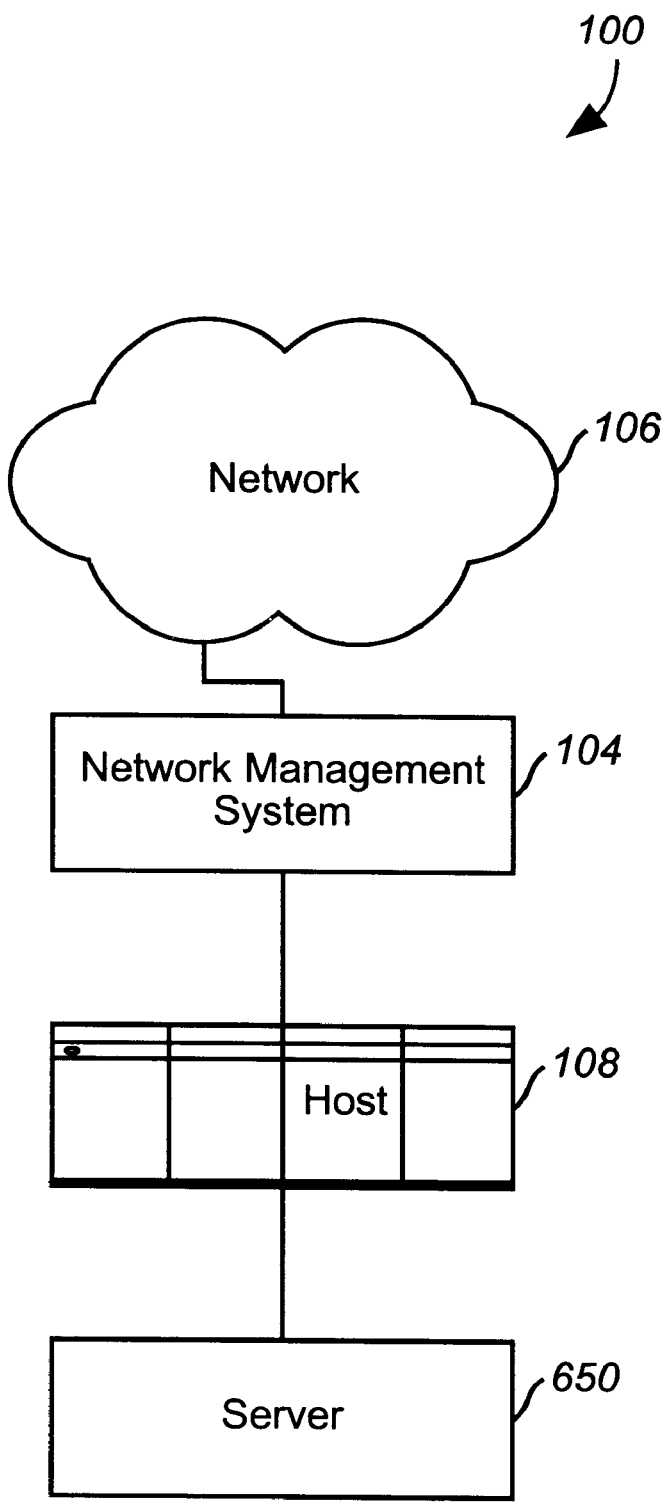
FIG. 7 illustrates an example of a back-end configuration for the fault management system.

FIG. 7 illustrates an example of a back-end configuration for the fault management system for reporting telecommunication service conditions. The back-end configuration includes a network management system 104 which collects network events, including alarms and traffic densities from a common carrier network 106. All of the events collected by network management system 104 are reported to an event monitor host 108. The common carrier keeps track of the performance and network faults for network 106 through a myriad of network management systems 104 and routes the information in real-time to the event monitor host 108. In order to provide information regarding a particular customer's leased services, events collected by event monitor host 108 are downloaded to event monitor server 650.

Event monitor server 650 accumulates in near real-time a database of events pertinent to each customer's leased services. The accumulated data is viewable via the client browser application GUI and also via the StarWRS reporting system as described above. Because individual customers may subscribe to various different services which may experience different events, event monitor server 650 must not only collect different sets of data on a real-time basis, but the client browser application GUI and the reporting system must also present the data in a format relevant to the particular services to which the customer subscribes. This data may be organized for display to the user in an event queue.

Figure 8:
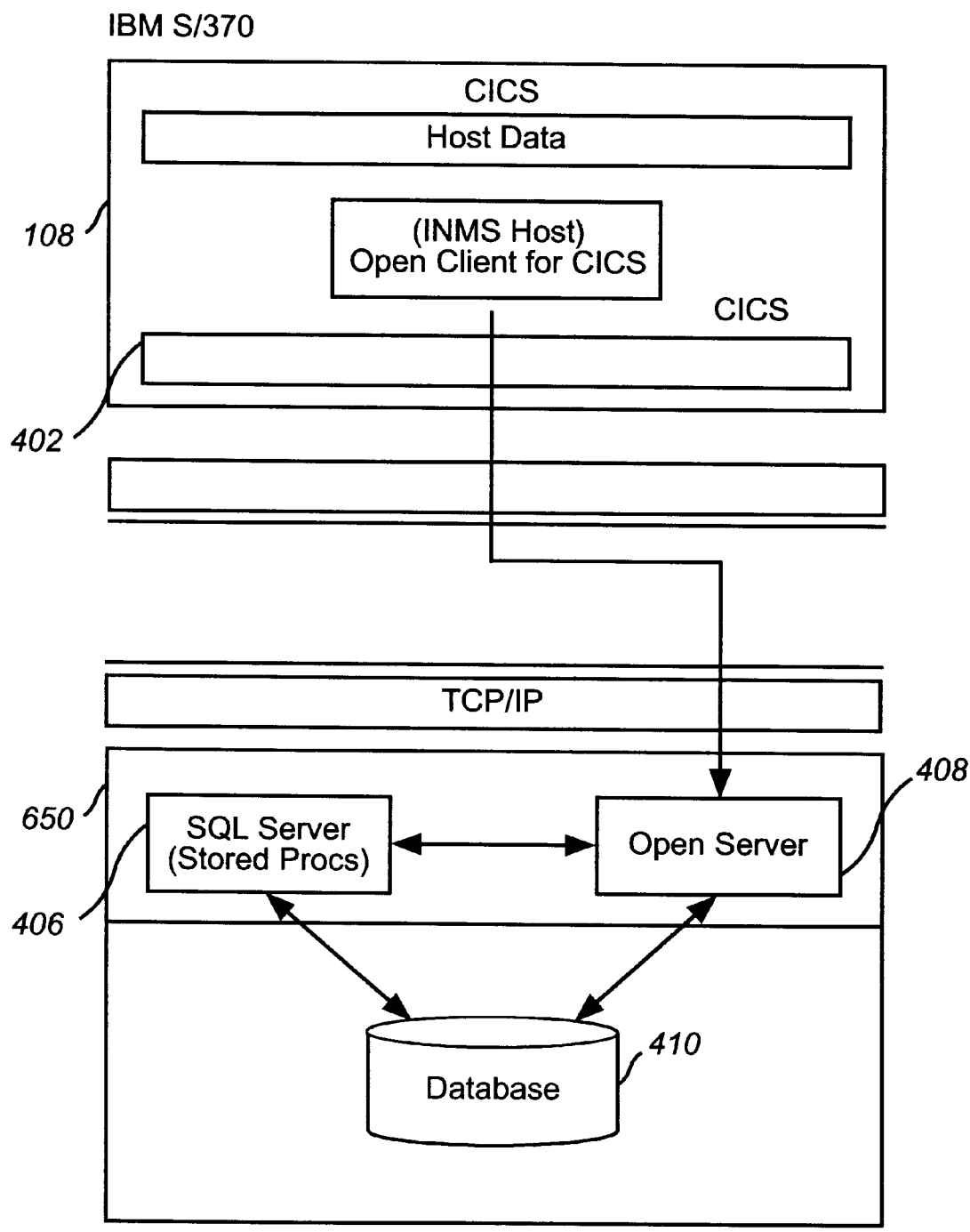
FIG. 8 illustrates an architectural view of a fault management host.

In the preferred embodiment of the present invention, event monitor host 108 is an Integrated Network Management System (INMS) host implemented as an IBM S/370 mainframe and the event monitor server 650 is implemented as the DEC Alpha and Sun Solaris; the architecture of this embodiment is depicted in FIG. 8. The present invention may be implemented in other ways, as would be apparent to one skilled in the relevant art.

Referring to FIG. 8, the INMS host 108 operates in an IBM Customer Information Control System (CICS) environment with a Transport Control Protocol/Internet Protocol (TCP/IP) connection to DEC Alapha event monitor server 650, which operates under the DEC UNIX operating system.

The Server 650 comprises two servers: a Structure Query Language (SQL) server 406 and an open server 408. Open server 408 receives events from INMS host 108 and stores them on a database 410 stored on server 650. The SQL server 406 is a database engine providing access to and managing database 410. In the preferred embodiment, database 410 is a Sybase® database and SQL server 406 is a Sybase® SQL server.

The Database 410 compiles information that is sent on a regular basis by INMS host 108. The data stored in the SQL server may be queried at will by a user via the client browser application for analysis. Database 410 is a relational database using SQL server 406 as the database management system (DBMS). In the preferred embodiment, database 410 comprises a database having four partitions.

The Database 410 includes a number of tables of data which are accessed by the client browser application GUI to event displays, including alarm displays, alarm report, facilities cross-references and event log displays. In addition to the StarOE authentication and entitlement checking, user access to database 410 is monitored by SQL server 406; levels of security may be provided to permit tiers of access to different levels of information within database 410, as would be apparent to one skilled in the relevant art.

The data within database 410 is organized in views. For example, an alarm view provides an alarm description, an alarm severity representing the degree of consequence for the alarm, and selected conditions associated with the alarm.

The interface between INMS host 108 and server 650 is two-way. In this scenario, the INMS host 108 is a client, issuing calls for stored procedures to SQL server 406 via TCP/IP when there is an event to report.

When a new customer is provisioned, the Event Monitor server 650 makes a client call to an INMS host session and updates the user profile table on the INMS host.

Figure 9:
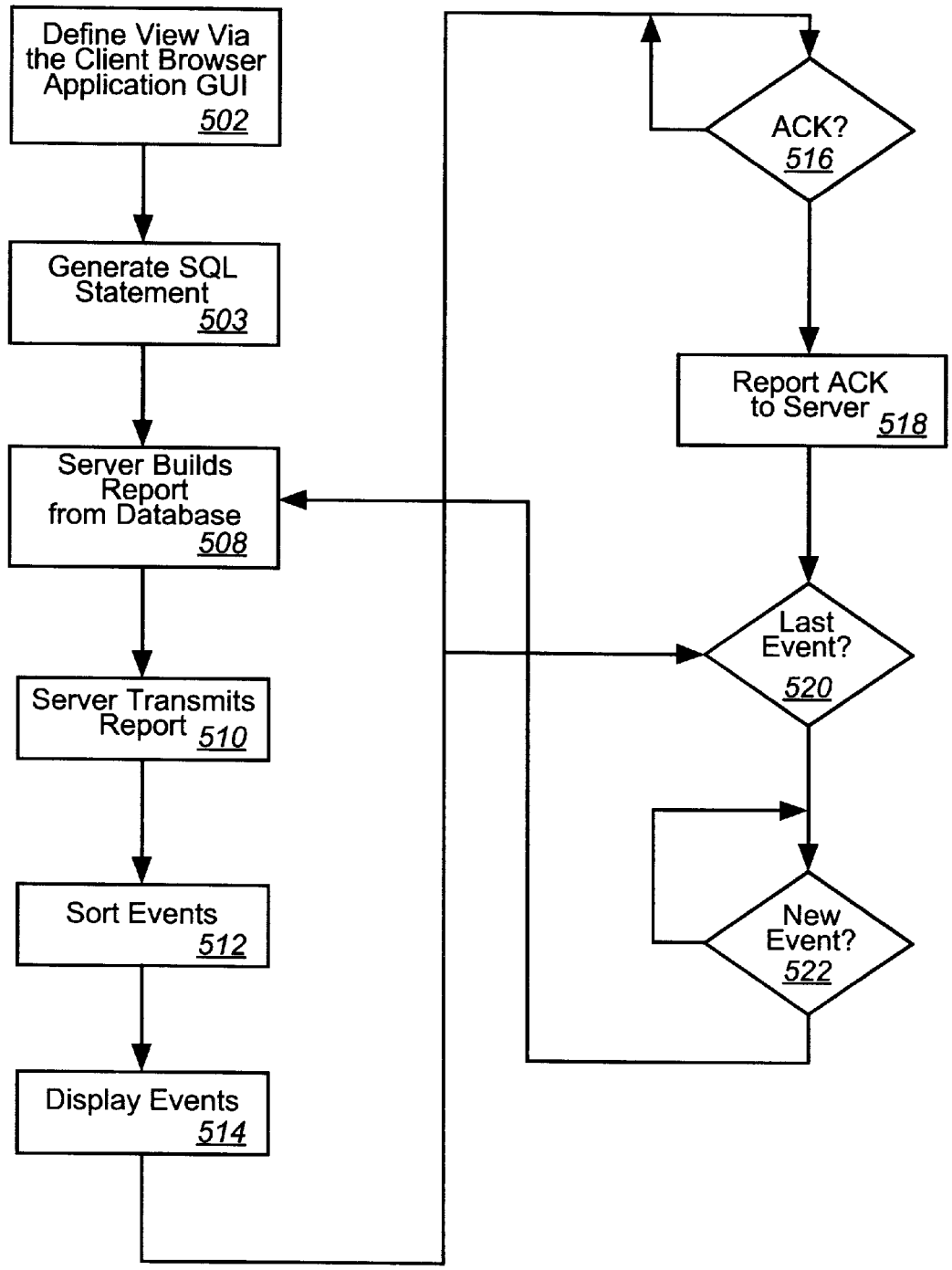
FIG. 9 is a high level logic flowchart depicting the operation of the preferred embodiment of the present invention.

FIG. 9 is a high level logic flowchart depicting the operation of the preferred embodiment of the present invention. Typically, a customer subscribes to several particular leased services. In order to limit data collection to data germane to those particular services, the user must specify the data to be collected. The user does this by defining an event view of data to be collected, as shown in a step 502. The event view specifies, for example, which services are to be monitored and what data is to be collected and reported for those services. For example, the event view may include the following items:

Severity: critical, major, minor, informational, no alert.

Service Types (MCI): 800, 900, TDS 1.5, TDS 45, VNET, Prism®, Vision®, ISDN, SW56, and DDS/DDO.

Corporate Identifiers: A list of corporate identifiers related to the customer's enterprise and for which the user is authorized access.

Facilities: All elements of a physical telephone plant required to provide a service and to which the user is authorized access (for example, trunk groups and circuits).

Data Elements: The user can configure a customized event view by selecting the data fields to be displayed.

Date and Time Elements: The user can configure a customized event view by selecting the date and time period for the custom event view.

Sort Order: The user can configure a customized event view by selecting, for example, the data fields on which the data to be displayed is sorted.

Once the event view has been defined, the client browser application transmits a transaction request to the server 650 via the web/dispatch server. A pre-defined stored procedure, which takes as input a "where" clause and an "order by" clause, is used to create the event view from data stored in database 410. In the preferred embodiment, the SQL statement is constructed such that each element/field is joined by an "AND" and values within each element/field are joined by an "OR." Thus, a partial SQL statement would be similar to:

Severity=critical OR severity=major

AND

Service Type=VNET

AND

CORPID=123434 OR CORPID=32432423

AND . . . etc.

The SQL statement created in step 502 is forwarded to SQL server 406. The SQL statement identifies to SQL server 406 the particular stored procedure to be activated to obtain the event view specified by the SQL statement. The SQL server 406 then executes the stored procedure and builds a report of event data specified by the event view, as shown in a step 508.

Once the event report is built, it is sent to the client browser via the web/dispatcher servers. The events are typically loaded into an event queue, which is a pass through mechanism existing between the INMS host and the Sybase database. The events in the event queue are sorted by sort criteria entered by the user when defining the event view, as shown at step 512. In a preferred embodiment, the primary sort criterium is severity. The sorted events are displayed to the user on the client browser application GUI in a step 514. Each event displayed is accompanied by an acknowledgment field for the user to indicate his acknowledgment of the event; for example, the user may acknowledge an event, if so authorized, by entering an asterisk in the associated acknowledgment field. When the user acknowledges an event, as indicated by the "Y" branch from step 516, the client browser application reports the acknowledgment to server 650, as shown at step 518. When the user has acknowledged the last event in the event queue, as indicated by the "y" branch from step 520, event processing ends. At this point, the user may either retain the session or close it.

If the session remains open, server 650 will report new events defined by the event view as they are received by server 650. When server 650 receives a new event, as indicated by the "Y" branch from step 522, processing resumes at step 408, as shown in FIG. 9.

Thus, in accordance with the event view defined by the user and communicated to event monitor server 650, reports of events identified in the event view may be periodically forwarded, based upon a customer configurable interval, to the client browser application, and made available in an event queue for display to the user in order of the severity of the event.

The Event Monitor Proxy

Figure 10A:
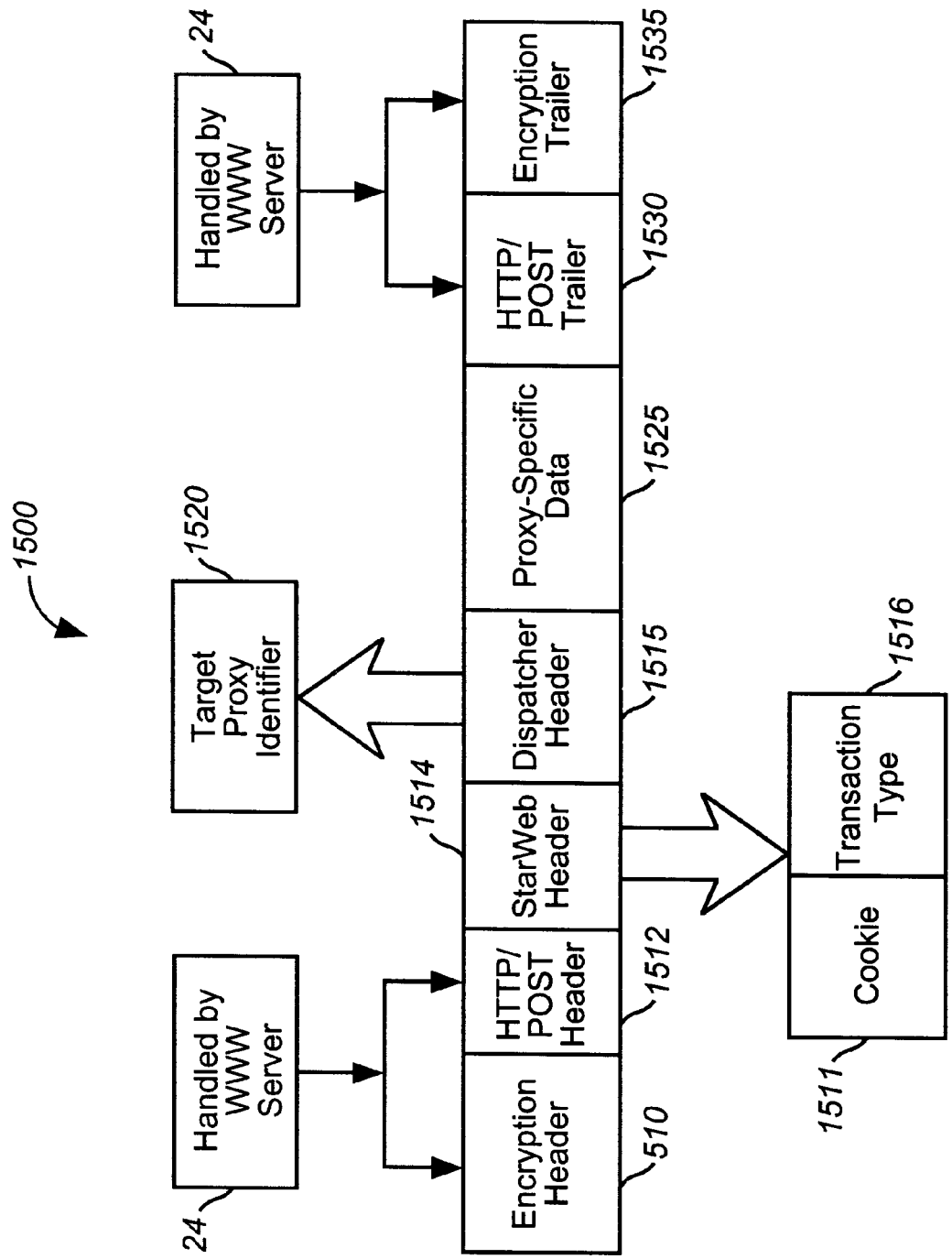
FIG. 10 illustrates a logical message format sent from the client browser to the desired middle tier server for a particular application.

As mentioned herein with respect to FIG. 2(*b*), the messages created by the client Java software are transmitted to the StarWeb (DMZ) Server 24 over HTTPS protocol. For incoming (client-to-server) communications, the DMZ Web servers 24 decrypt a request, authenticate and verify the session information. The logical message format from the client to the Web server is shown as follows:

|| TCP/IP || encryption || http || web header || dispatcher header || proxy-specific data|| where "||" separates a logical protocol level, and protocols nested from left to right. FIG. 10 illustrates a specific message sent from the client browser to the desired middle tier server for the particular application. As shown in FIG. 10, the client message 1500 includes an SSL encryption header 510 and a network-level protocol HTTP/POST header 1512 which are decrypted by the DMZ StarWeb Server(s) 24 to access the underlying message; a DMZ Web header 1514 which is used to generate a cookie 1511 and transaction type identifier 1516 for managing the client/server session; a dispatcher header 1515 which includes the target proxy identifier 1520 associated with the particular type of transaction requested; proxy specific data 1525 including the application specific metadata utilized by the target proxy to form the particular messages for the particular middle tier server providing a service; and, the networklevel HTTP/POST trailer 1530 and encryption trailer 1535 which are also decrypted by the DMZ Web server layer 24.

After establishing that the request has come from a valid user and mapping the request to its associated session, the request is re-encrypted and then forwarded through the firewall 25 over an encrypted socket connection 23 to one or more decode/dispatch servers 26 located within the corporate Intranet 30 (FIG. 2(*b*)).

The messaging sent to the dispatcher includes the user identifier and session information, the target proxy identifier, and the proxy specific data. The decode/dispatch server 26 decrypts the request and authenticates the user's access to the desired middle-tier service.

It should be understood that networking-level protocols and HTTP may be handled by off-the-shelf Web server software, e.g., Netscape Enterprise Server, or other Web Services-type cluster software that maintains a virtual client connection state. The "networkMCI Interact" DMZ Web services software may be invoked by the "networkMCI Interact" StarWeb server 24 using a POST-type mechanism, such as: a Netscape servlet API, CGI or like equivalent.

As shown in FIG. 10, the StarWeb server 24 forwards the Dispatcher header and proxy-specific data to the Dispatcher, "enriched" with the identity of the user (and any other session-related information) as provided by the session data/cookie mapping, the target proxy identifier and the proxy-specific data. The dispatch server 26 receives the encrypted requests forwarded by the Web server(s) 24 and dispatches them to the appropriate application server proxies. Particularly, the messages are decrypted, and the wrappers are examined, revealing the user and the metadata-type service request. A first-level validation is performed, making sure that the user is entitled to communicate with the desired service. The user's entitlements in this regard would be fetched by the dispatch server 26 from StarOE server 660 at logon time and cached. Assuming that the requestor is authorized to communicate with the target service, the message would be forwarded to the desired service's proxy.

Particularly, as explained generally above with respect to FIG. 6, the dispatch server 635 receives encrypted request messages forwarded by the DMZ Web servers (shown with dispatch server) and dispatches them to the appropriate server proxies. The messages are decrypted, and the wrappers are examined, revealing the user and the target middle-tier service for the request.

A first-level validation is performed, making sure that the user is entitled to communicate with the desired service. The user's entitlements in this regard are fetched by the dispatch server from StarOE server 660 at logon time and cached. Assuming that the requestor is authorized to communicate with the target service, the message is then forwarded to the desired service's proxy, which, in accordance with the principles described herein, is the event monitor service proxy 640 corresponding to the event monitor server 650. This proxy process further performs: a validation process for examining incoming requests and confirming that they include validly formatted messages for the service with acceptable parameters; a translation process for translating a message into the database query message or networking protocol; and, a management process for managing the communication of the specific customer request with the middle-tier server to actually get the request serviced. Data returned from the "networkMCI Interact"'s server is translated back to client format, if necessary, and returned to the dispatch server as a response to the request.

Figure 11A:
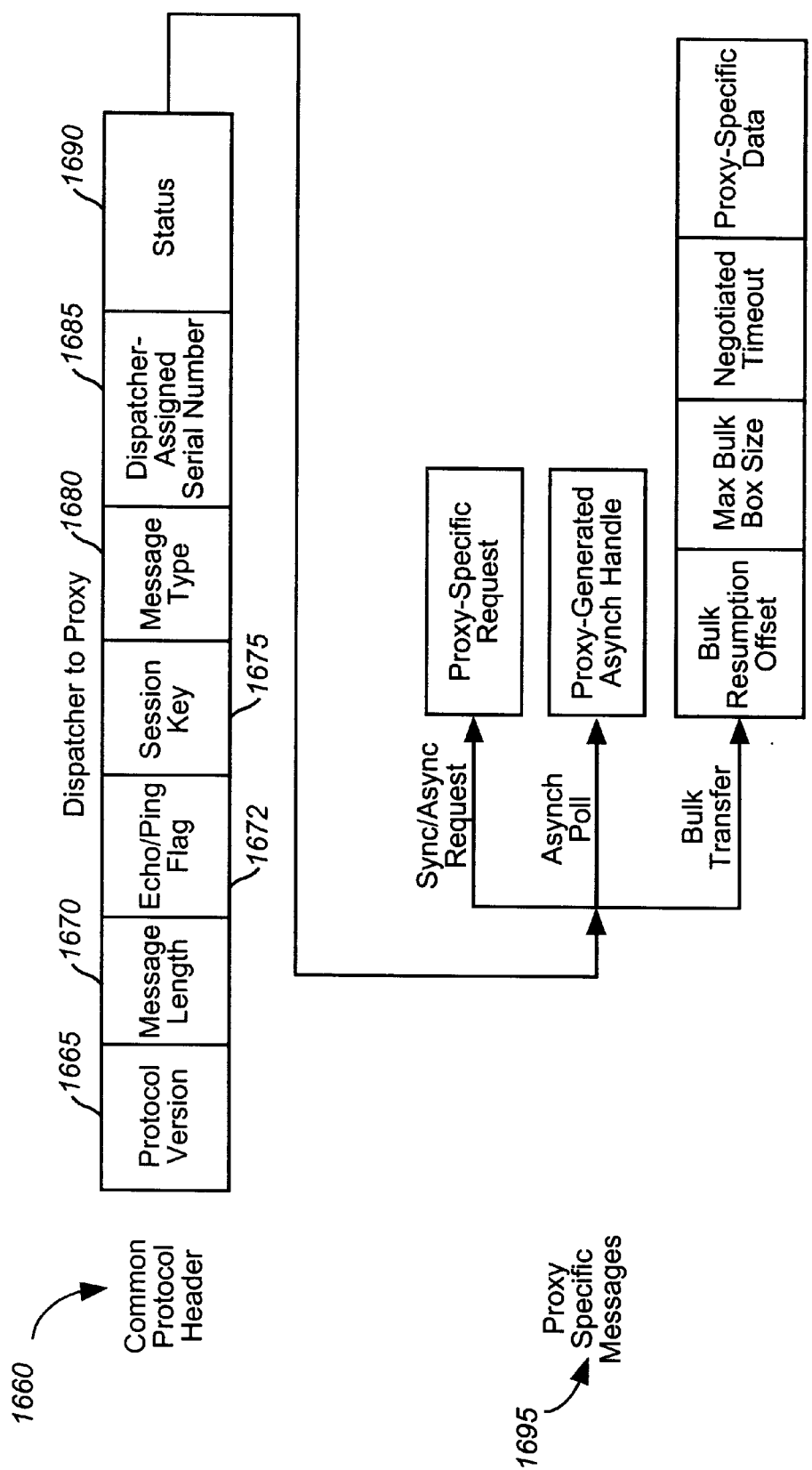
FIGS. 11(a) and 11(b) are schematic illustrations showing the message format passed between the dispatch server and the application specific proxy (FIG. 11(a)) and the message format passed between the application specific proxy back to the dispatch server (FIG. 11(b))
Figure 11B:
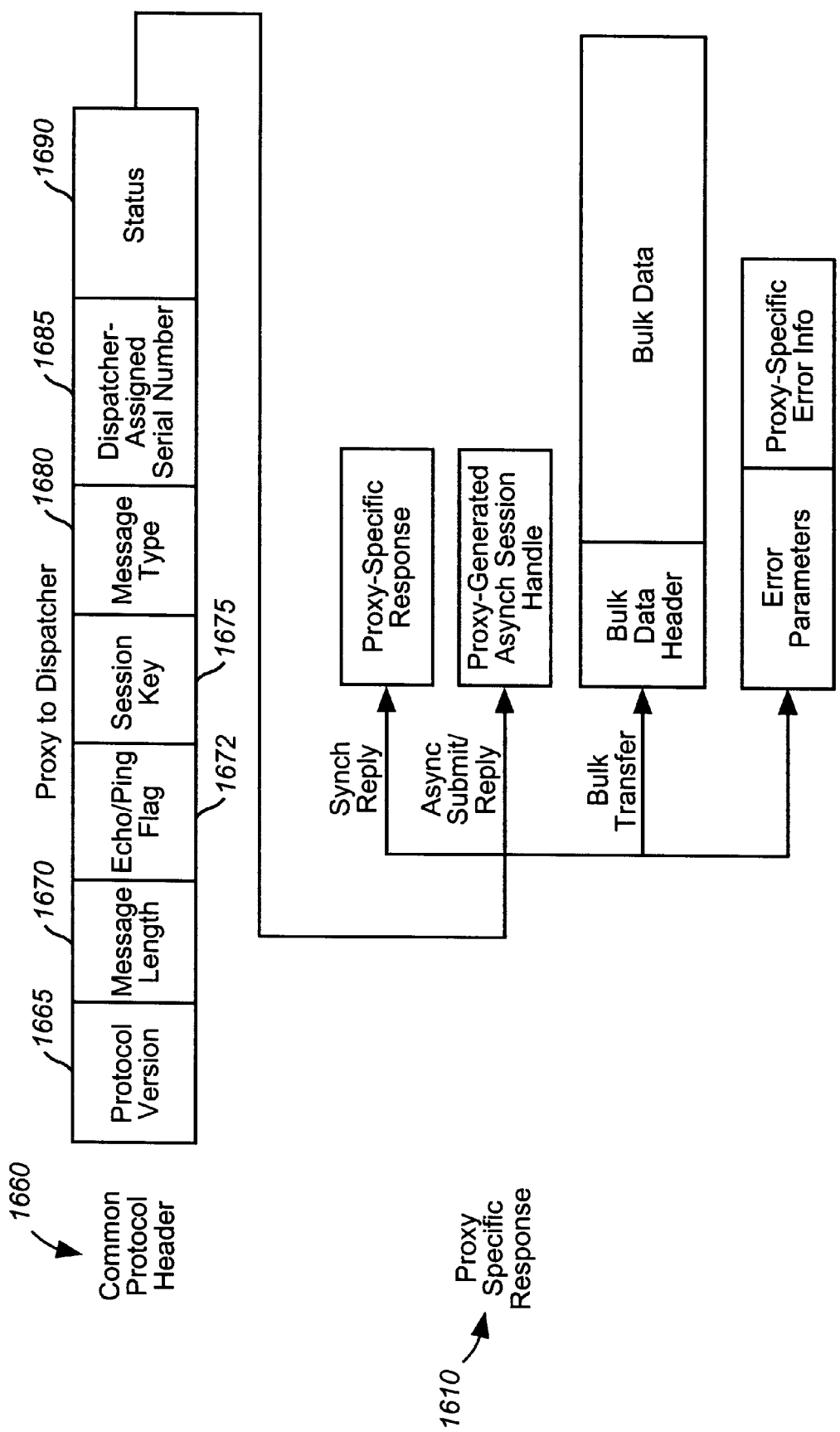

FIGS. 11(*a*) and 11(*b*) are schematic illustrations showing the message format passed between the Dispatcher 635 and the application specific proxy (FIG. 11(*a*)) and the message format passed between the application specific proxy back to the Dispatcher 635 (FIG. 11(*b*)). As shown in FIG. 11(*a*), all messages between the dispatcher and the proxies, in both directions, begin with a common header 1660 to allow leverage of common code for processing the messages. A first portion of the header includes the protocol version 1665 which may comprise a byte of data for identifying version control for the protocol, i.e., the message format itself, and is intended to prevent undesired mismatches in versions of the dispatcher and proxies. The next portion includes the message length 1670 which, preferably, is a 32-bit integer providing the total length of the message including all headers. Next is the echo/ping flag portion 1672 that is intended to support a connectivity test for the dispatcher-proxy connection. For example, when this flag is non-zero, the proxy immediately replies with an echo of the supplied header. There should be no attempt to connect to processes outside the proxy, e.g. the back-end application services. The next portion indicates the Session key 1675 which is the unique session key or "cookie" returned by the Web browser and used to uniquely identify the session at the browser. As described above, since the communications middleware is capable of supporting four types of transport mechanisms, the next portion of the common protocol header indicates the message type/mechanism 1680 which may be one of four values indicating one of the following four message mechanisms and types: 1)Synchronous transaction, e.g., a binary 0; 2) Asynchronous request, e.g., a binary 1; 3) Asynchronous poll/reply, e.g., a binary 2; 4) bulk transfer, e.g., a binary 3.

Additionally, the common protocol header section includes an indication of dispatcher-assigned serial number 1685 that is unique across all dispatcher processes and needs to be coordinated across processes (like the Web cookie (see above)), and, further, is used to allow for failover and process migration and enable multiplexing control between the proxies and dispatcher, if desired. A field 1690 indicates the status is unused in the request header but is used in the response header to indicate the success or failure of the requested transaction. More complete error data will be included in the specific error message returned. The status field 1690 is included to maintain consistency between requests and replies. As shown in FIG. 10, the proxy specific messages 1695 may be metadata message requests from a Report Requestor client (not shown) in the manner such as shown and described in co-pending U.S. patent application Ser. No. 09/159,409. Likewise, the proxy specific responses are metadata response messages 1610 again, capable of being transmitted via a synch, asynch or bulk transfer transport mechanism.

It should be understood that the application server proxies may either reside on the dispatch server 635 itself, or preferably, on the middle-tier application server, i.e., the dispatcher front-end code is able to locate proxies resident on other servers.

As mentioned, each back-end service has a proxy process with three responsibilities: validate, translate, communicate. Validation includes of parsing incoming requests, analyzing them, and confirming that they include validly formatted messages for the service with. acceptable parameters. If necessary, the message is translated into an underlying message or networking protocol. If no errors in the message are found, the proxy then manages the communication with the middle-tier server to actually get the request serviced. The application proxy supports application specific translation and communication with the back-end application server for both the Web Server (java applet originated) messages and application server messages.

Proxy functions and utilities provided include enabling multithreaded proxy functionality in order that the proxies may service multiple clients simultaneously. The logic flow diagram illustrating the multithreading functionality is shown in FIGS. 12(*a*)–12(*c*).

Figure 12A:
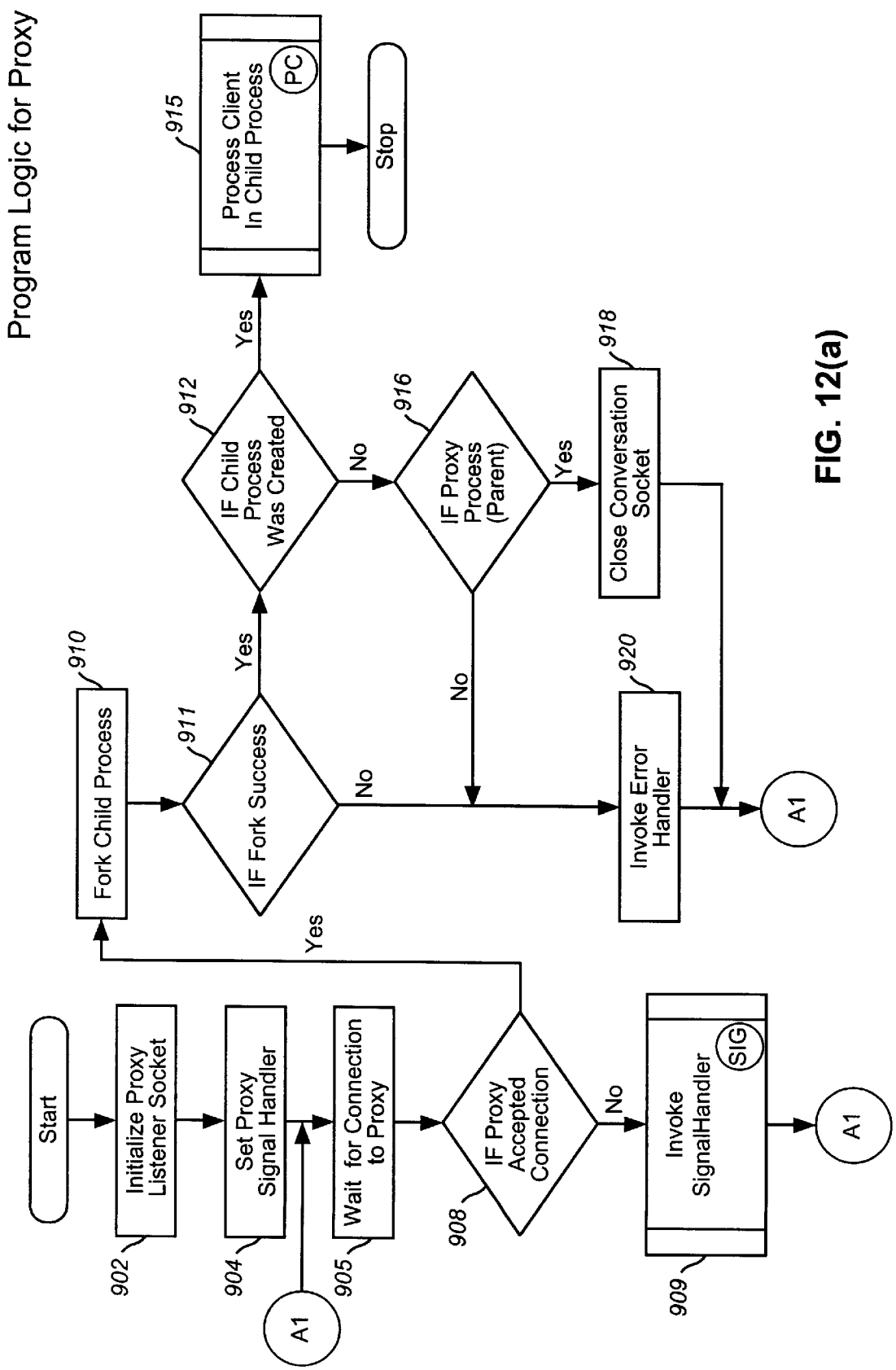
FIGS. 12(a), 12(b), and 12(c) illustrate a low level logic flow diagram depicting the multithreading functionality of the proxies.
Figure 12B:
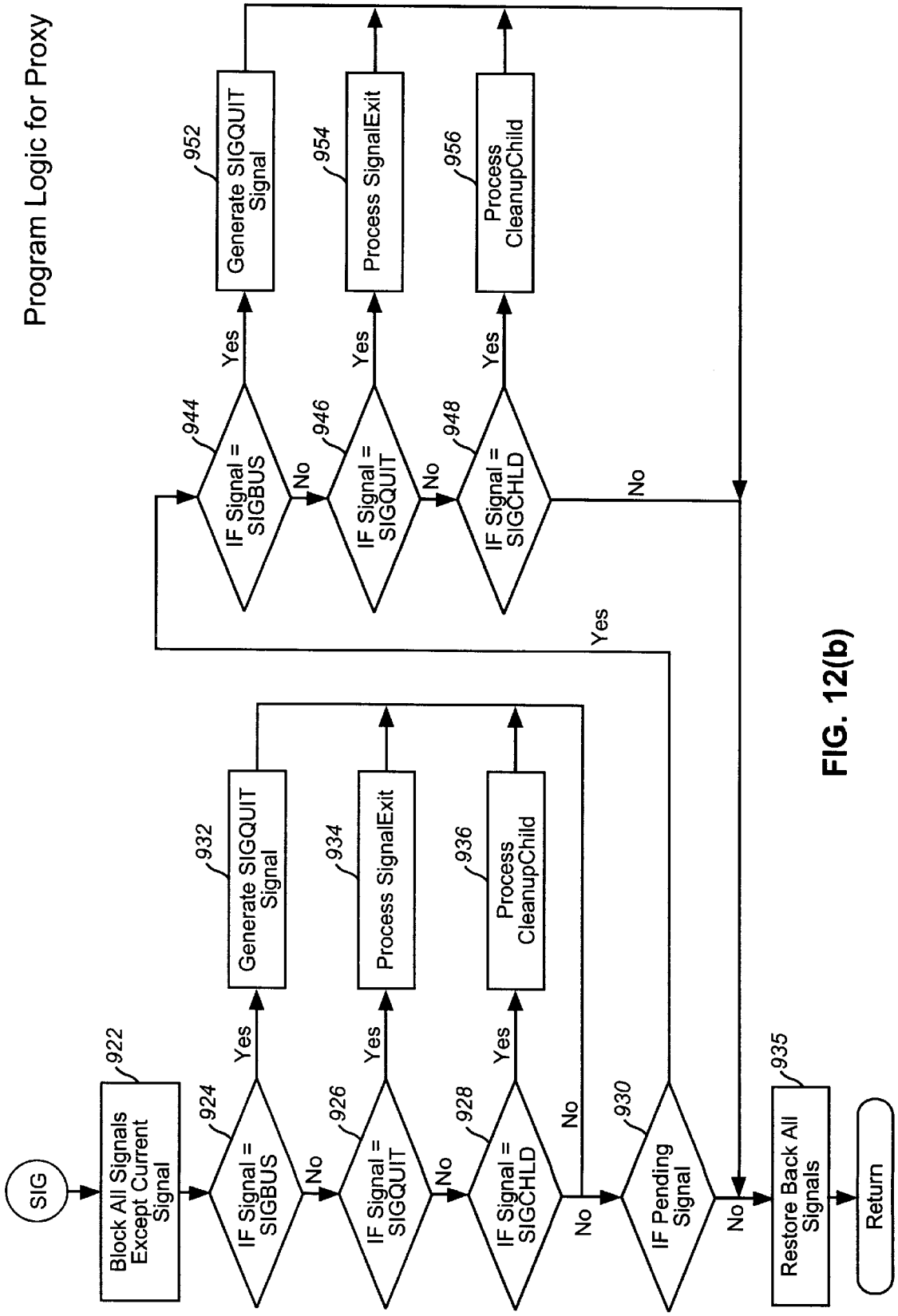
Figure 12C:
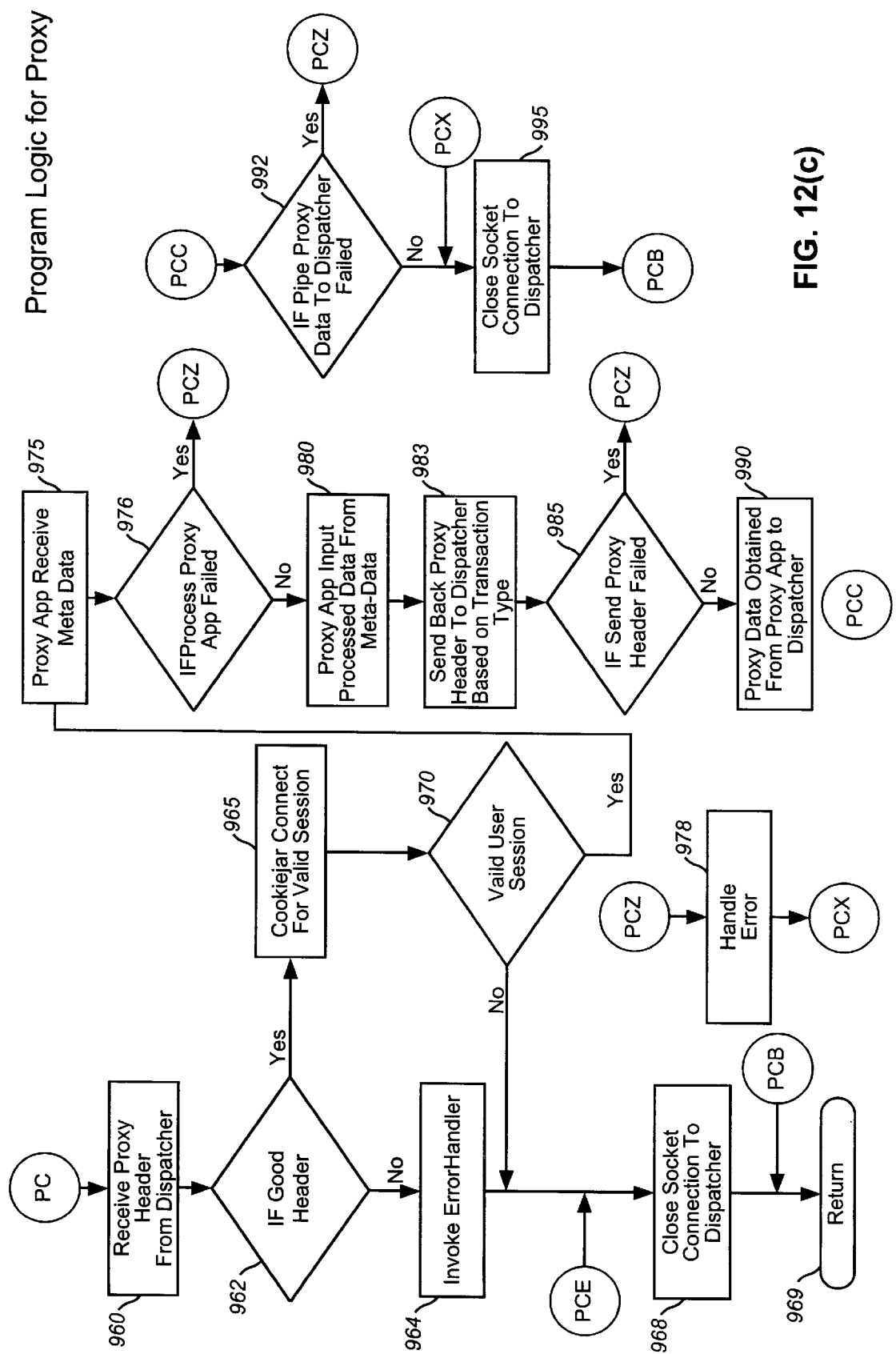

Specifically, as shown in FIG. 12(*a*), step 902, a proxy listener socket on a middle-tier server, e.g., event monitor server, is first initialized. A proxy signal handler is invoked at step 904 to wait for a connection signal from the dispatcher server, as indicated at step 905. At step 908, a determination is made as to whether the proxy has accepted a connection request from the dispatcher. If the proxy could not accept the connection, a SignalHandler Routine is invoked as indicated at step 909 and described with reference to FIG. 12(*b*). If the proxy accepts the connection, a child process is instantiated as indicated at step 910. A determination is next made at step 911 to determine if the forked process was successful. If the forked process was successful, then a check is made at step 912 to determine if the child process was created for that session. If the child process was created, then the child process is invoked at step 915 as described with reference to FIG. 12(*c*). If the child process was not created, a determination is made at step 916 to determine whether the parent proxy process is still executing. If the parent is still executing, then the current conversation socket is closed, as indicated at step 918, and the process returns to step 905. If the parent is not alive, then an error handler routine is invoked at step 920, and the process returns to step 905.

Returning back to step 908, if the proxy could not accept a connection request, the Signal Handler routine which described with reference to FIG. 12(*b*), is invoked. As shown at step 922, the SignalHandler routine first blocks all signals except the current signal. Then at step 922 a determination is made at step 924 as to whether the received (current) signal is equal to the SIGBUS indicating a bus failure. If the received signal is not equal to SIGBUS, then a determination is made at step 926 as to whether the received signal is equal to the SIGQUIT. If the received signal is not equal to SIGQUIT, then a determination is made at step 928 as to whether the received signal is equal to the SIGCHLD. If the received signal is not equal to SIGCHLD, then a determination is made at step 930 as to whether a signal is pending.

If, at step 924, it is determined that the received signal is equal to SIGBUS, then a SIGQUIT signal indicating that the process should exit, is generated at step 932, and the process returns to step 930. If, at step 926, it is determined that the received signal is equal to SIGQUIT, then a SignalExit process is invoked to exit as indicated at step 934, and the process returns to step 930. If, at step 928, it is determined that the received signal is equal to SIGCHLD, then a CleanupChild process is invoked to clear and reinitialize the child process procedures and terminate the child process as indicated at step 936, and the process returns to step 930. If none of these signals were generated and no signals are pending, then at step 935 all signals are restored and the process returns to step 905, FIG. 12(*a*).

If it is determined that a signal is pending at step 930, then the process proceeds to step 944. At step 944, a determination is made as to whether the received signal is equal to the SIGBUS indicating bus error. If the received signal is not equal to SIGBUS, then a determination is made at step 946 as to whether the received signal is equal to the SIGQUIT. If the received signal is not equal to SIGQUIT, then a determination is made at step 948 as to whether the received signal is equal to the SIGCHLD. If the received signal is not equal to SIGCHLD, then the process proceeds to step 935 where all signals are restored and the process returns to step 905, FIG. 12(*a*).

If, at step 944, it is determined that the received signal is equal to SIGBUS, then a SIGQUIT signal indicating that the process should exit is generated at step 952, and the process returns to step 935. If, at step 946, it is determined that the received signal is equal to SIGQUIT, then a SignalExit process is invoked to terminate the process as indicated at step 954, and the process returns to step 935. If, at step 948, it is determined that the received signal is equal to SIGCHLD, then a CleanupChild process is invoked to clear and reinitialize the child process local data and procedure as indicated at step 956, and the process returns to step 935. If none of these signals were generated all signals are restored at step 935 and the process returns to step 905, FIG. 12(*a*).

Referring back to FIG. 12(*a*), the client request is processed by the forked child process as indicated at step 915. This procedure is described with reference to FIG. 12(*c*) where, at step 960, the proxy header is received from the dispatcher. If the header does not conform to the protocol, then at step 964, an error handling routine is invoked, and the socket connection to the dispatcher is closed, as indicated at step 968, and the process terminates by returning at step 969 to the invoking procedure (FIG. 12(*a*)). If the header conforms to the messaging protocol as determined at step 962, then a validation step is performed at step 965 wherein a connection to the Web server cookie jar is implemented to determine the validity of the current session. Next, a determination is made at step 970 as to whether the current session is a valid user session. If the current session is validated, then the process proceeds to step 975. Otherwise the process proceeds to step 968 to close the socket connection to the Dispatcher.

At step 975, FIG. 12(*c*), the proxy application receives the metadata message. At step 976, a determination is made as to whether the process proxy application failed. If the proxy process failed, the program handles the error as indicated at step 978. If there is no error, the proxy application inputs processed data from the meta data descriptions as indicated at step 980, and sends back the proxy header to the Dispatcher based on the transaction type, as indicated at step 983.

A determination is made at step 985 as to whether an error occurs when sending the proxy header. If an error occurs, the program handles the error as indicated at step 987 and closes the socket connection to the dispatcher server as indicated at step 995. Otherwise, as indicated at step 990, the proxy data obtained from the proxy application is sent to the dispatcher in accordance with the specified transaction mechanism. A determination is made at step 992 as to whether an error occurs when sending the proxy data back to the dispatcher server. If an error occurs, the program handles the error as indicated at step 978 and closes the socket connection to the dispatcher as indicated at step 995. If the transmission is successful, the socket connection to the dispatcher server closes, as indicated at step 995 and the process returns to step 905, FIG. 12(*a*), to await the next proxy connection request.

Outgoing (server-to-client) communications follow the reverse route, i.e., the proxies feed responses to the decode/dispatch server, which encrypts the client-bound messages and communicates them to the DMZ Web servers over the socket connection. The Web servers forwards the information to the client using SSL. The logical message format returned to the client from the middle tier service is shown as follows:

∥ TCP/IP ∥ encryption ∥ http ∥ web response ∥ dispatcher response ∥ proxy-specific response ∥ where "∥" separates a logical protocol level, and protocols nested from left to right.

As described above, the Event Monitor application is an objected oriented application implemented in a client server architecture. The proxy (FIG. 6 at 640) servers have a paired client side stub implementation used to initiate browser requests and receive server responses. The proxy servers and client side stub implementations share common interfaces. These interfaces describe the methods that are valid for a particular proxy server.

In general, Event Monitor proxy (FIG. 6 at 640) servers 1) invoke methods received when their corresponding client side stub method is invoked by the browser 630 and; 2) return responses for the requesting client side stub method, if required.

In particular, the Event Monitor Server proxy 640 is a process with multiple interfaces to the Event Monitor Web server database and GUI 630, each interface providing method signatures for a series of discrete services via specific Java methods. These interface/method combinations include: 1) HSAlarmServerInterface which provides SNMP alarm functionality via 1a) getAlarmList method; 1b) recordAlarm method; and 1c) clearAlarm method. 2) HSMapServerInterface which provides graphical configuration mapping functionality via 2a) getSwitchLocations method; 2b) getAccessCircuits method; and 2c) getPVCList method; 3) HSReportServerInterface which provides report management and delivery functionality via 3a) getReport method; 3)b getReportList method; 3c) getInboxReports method; and 3d) setReportGeneration method; 4) HSServerInterface which provides Broadband Web server access functionality via 4a) logon method; 5) HSSnmpServerInterface which provides SNMP Get/Set functionality via 5a) getSnmpCategories method; 5b) getPVCList method; 5c) getCircuitList method; 5d) setAttribute method; and 5e) getAttribute method; 6) HSUtilityServerInterface which provides the interface for all other browser functionality via Ga) getLevelOfService method; 6b) getHelpDeskNumber method; 6c) getCircuitLocation method; 6d) setCircuitLocation method; 6e) getServiceType method; and 6f) getMessageCenterText method; 7) HSEMReportServerInterface which provides an interface to the features available in the Event Monitor database via 7a) changeReportName method; 7b) createReport method; 7c) deleteReport method; 7d) getAlarms method; 7e) getAlarmTypes method; 7f) getCorpIDList method; 7g) getDALGroups method; 7h) getDataCircuits method; 7I) getFacilities method; 7j) getReport method; 7k) getReportCategories method; 7l) getReportList method; 7m) getServiceTypes method; 7n) getvoiceCircuits method; and 7o) updateReport method.

Each server side method 1) performs a specific back-end function. It may also, 2) return an object, or basic type (int, float, etc.) to the invoking client side stub. Most methods generally perform back-end database updates, keyed by values as documented below. Object returning methods return either 1) a single object made up of string values as documented below or 2) vector objects, including lists. The vector objects are variable byte streams and are essentially objects that are containers for a group of related objects. Every server side method has the ability of throwing error exceptions, in lieu of generated return codes.

The interface/method combinations mentioned above are herein described:

1) HSAlarmServerInterface
   1a) getAlarmList method which returns a vector of alarms to the customer browser in format
      public Vector
         getAlarmList( )
            throws HSException, IOException;
   1b) recordalarm method which writes an intercepted alarm to the Broadband database in format
      public void
         recordalarm
            String alarmType_,
            String interfaceID_,
            int alarmID_,
            String timeStamp_,
            int severityLevel_,
            String alarmText_
         ) throws HSException, IOException;
   1c) clearAlarm method which deletes an alarm from the Broadband database in format
      public void
         clearAlarm
         (
            String alarmType_,
            String interfaceID_,
            int alarmID_,
            String timeStamp_
         ) throws HSException, IOException;

2) HSMapServerInterface
   2a) getSwitchLocations method which returns vector HSSwitchLocation, a list of switch locations, to the customer browser in format
      public Vector
         getSwitchLocations( )
            throws HSException, IOException;
   2b) getAccessCircuits method which returns vector HSAccessCircuit, a list of access circuits, to the customer browser in format
      public Vector
         getAccessCircuits( )
            throws HSException, IOException;
   2c) getPVCList method which returns vector<HSPVC>, (permanent virtual circuit), to the customer browser in format
      public Vector
         getPVCList( )
            throws HSException, IOException;

3) HSReportServerInterface
   3a) getReport method which returns object HSReport to the customer browser in format
      public HSReport
         getReport
         (
         int reportID_,
         int reportType_,
         int scheduleType_,
         GregorianCalendar date_
         )
         throws HSException, IOException
   3b) getReportList method which returns vector<HSReport>, a list of valid report types, to the customer browser in format
      public Vector
         getReportList( )
            throws HSException, IOException
   3c) getInboxReports method which returns vector<HSReport>, a list of reports available in the customer's Inbox, to the customer browser in format
      public Vector
      getInboxReports()
      throws HSException, IOException;
   3d) setReportGeneration method which returns Boolean value to the customer browser after updating the Broadband database in format
      public boolean
      setReportGeneration
      (
      int reportID_,
      int reportType_,
      int scheduleType_,
      boolean generateReports_
      )
      throws HSException, IOException;

4) HSServerInterface
   4a) logon method which returns a Boolean value to the customer browser after authenticating customer access in format
      public boolean
      logon
      (
      String password_
      throws HSException, IOException;

5) HSSnmpServerInterface
   5a) getSnmpCategories method which returns vector<HSSnmpCategory>, a list of SNMP performance variables, to the customer browser in format
      public Vector
      getSnmpCategories( )
      throws HSException, IOException;
   5b) getPVCList method which returns vector<String>, each String a PVC number, to the customer browser in format
      public Vector
      getPVCList( )
      throws HSException, IOException;
   5c) getCircuitList method which returns vector<String>, each String a Circuit ID, to the customer browser in format
      public vector
      getCircuitList( )
      throws HSException, IOException;
   5d) setAttribute method which updates the an SNMP variable in the Broadband databasesets in format
      public void
      setAttribute
      (
      String attribute_,
      String attributeValue_,

```
        int type__,
        String typeValue__
        throws HSException, IOException;
    5e) getAttribute method which returns object <String>,
        the string being and SNMP attribute name, to the
        customer browser in format
        public String
        getAttribute
            (
            String category__,
            String attribute__,
            int type__,
            String typeValue__
            ) throws HSException, IOException;
6) HSUtilityServerInterface
    6a) getLevelOfService method which returns object
        HSUtilityServiceLevel,a level of service value, to
        the customer browser in format
        public HSUtilityServiceLevel
        getLevelOfService( )
        throws HSException, IOException
    6b) getHelpDeskNumber method which returns object
        <String>, the string being a customer service contact
        phone number, to the customer browser in format
        public String
        getHelpDeskNumber( )
        throws HSException, IOException;
    6c) getCircuitLocation method which returns vector
        <String>, each string a circuit location ID, to the
        customer browser in format
        public Vector
        getCircuitLocation( )
        throws HSException, IOException;
    6d) setCircuitLocation method which returns a boolean
        value to the customer browser after updating circuit
        location values in the Broadband database in format
        public boolean
        setCircuitLocation
            (
            String circuitID__,
            String circuitLocation__
            )
        throws HSException, IOException;
    6e) getServiceType method which returns object
        HSServiceType,a broadband service type (Frame
        Relay or SMDS) identifier, to the customer browser
        in format
        public HSServiceType
        getServiceType( )
        throws HSException, IOException;
    6f) getMessageCenterText method which returns object
        <String>the string being a textual string value, to the
        customer browser in format
        public String
        getMessageCenterText( )
        throws HSException, IOException; format
7) HSEMReportServerInterface
    7a) changeReportName method which updates a report
        in the Event Monitor database in format
        public HSEMReport
        reportName( )
        throws HSException, IOException; format
    7b) createReport method which creates a new report
        entry in the Event Monitor database in format
        public HSEMReport
        reportName( )
        throws HSException, IOException; format
    7c) deleteReport method which remove a report from
        the Event Monitor database in format
        public void
        deleteReport
            (
            String reportName
            )
        throws HSException, IOException;
    7d) getAlarms method which returns vector <String>,
        each string an Event Monitor alarm, to the customer
        browser in format
        public Vector
    getAlarms( )
    throws HSException, IOException;
    7e) getAlarmTypes method which returns vector
        <HSEMAlarmTypes>, an Event Monitor alarm type,
        to the customer browser in format
        public HSEMAlarmTypes
            getAlarmTypes( )
            throws HSException, IOException;
    7f) getCorpIDList method which returns vector
        <String>, each string an Event Monitor customer's
        list of Corp IDs, to the customer browser in format
        public Vector
            getCorpIDList( )
            throws HSException, IOException;
    7g) getDALGroups method which returns vector
        <HSEMDALGroup>, an Event Monitor customer's
        list of provisioned DAL Groups, to the customer
        browser in format
        public HSEMDALGroup
            getDALGroups( )
            throws HSException, IOException;
    7h) getDataCircuits method which returns vector
        <HSEMDataCircuit>, an Event Monitor customer's
        list of provisioned data circuits, to the customer
        browser in format
        public HSEMDataCircuit
            getDataCircuits( )
            throws HSException, IOException;
    7I) getFacilities method which returns vector
        <HSEMFacility>, an Event Monitor customer's list
        of provisioned facilities, to the customer browser in
        format
        public HSEMFacility
            getFacilities( )
            throws HSException, IOException;
    7j) getReport method which returns vector
        <HSEMReportResult>, a result set satisfying the
        report requests parameters, to the customer's
        browser in format
        public HSEMReportResult
            getReport( )
            throws HSException, IOException;
    7k) getReportCategories method which returns vector
        <HSEMReportCategory>, a list of report categories
        available to the customer, to the browser in format
        public HSEMReportCategory
            getReportCategories( )
            throws HSException, IOException;
    7l) getReportList method which returns vector
        <HSEMReport>, a list of reports defined for a
        customer, to the customer browser in format
        public HSEMReport
            getReportList( )
            throws HSException, IOException;
    7m) getServiceTypes method which returns vector
        <String>, each string being a list of service type
``` names available to this customer for the given report category, to the customer browser in format
public Vector
    getServiceTypes( )
    throws HSException, IOException;
7n) getvoiceCircuits method which return vector <HSEMVoiceCircuits>, a list of the customers provisioned voice circuits, to the customer browser in format
public HSEMVoiceCircuits
    getVoiceCircuitr( )
    throws HSException, IOException;
7o) updateReport method which updates a report criteria entry in the Event Monitor database in format
public HSMEReport
    updateReport
    (
    String criteria_
    throws HSException, IOException;

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A Web-based event monitoring system for communicating information relating to voice and data network from an enterprise to a customer at a client workstation, the system comprising:
    a client browser application located at the client workstation for enabling interactive Web-based communications with the event monitoring system and providing an integrated interface to the enterprise;
    a device for deriving performance alarms based on performance statistics collected on the performance of the voice and data network;
    a server device for receiving and storing the performance statistics and the derived alarms from the device for deriving; and
    a presentation device for enabling the customer to define and display reports associated with the derived alarms and the performance statistics at the client workstation, the presentation device further receiving the alarms as they are derived from the server device and presenting the alarms to the customer at the client workstation,
    wherein the customer is enabled to receive and view the alarms and the performance statistics relating to the voice and data network to which the customer has subscribed, at the client workstation via the integrated interface.

2. The system as claimed in claim 1, wherein the presentation device further notifies the customer according to a predetermined user notification protocol when the alarms are received from the server device.

3. The system as claimed in claim 2, wherein the user notification protocol includes notification via paging.

4. The system as claimed in claim 2, wherein the user notification protocol includes notification via e-mail.

5. The system as claimed in claim 2, wherein the user notification protocol includes notification via fax.

6. The system as claimed in claim 1, wherein the server device polls the presentation device to deliver the derived alarms via the integrated interface.

7. The system as claimed in claim 1, wherein the presentation device further allows customers to define and enter via the integrated interface, network performance thresholds specifying reporting of specific network behavior, wherein the network alarms and performance statistics are filtered according to the customer-defined threshold and presented to the customer at the client workstation.

8. The system as claimed in claim 1, wherein the presentation device further allows the customer to define and enter via the integrated interface troubleshooting procedures for specific alarms or circuits pertaining to the voice and data network.

9. The system as claimed in claim 8, wherein the systems further comprises a device for automatically launching the trouble shooting procedure when the customer receives and acknowledges the alarm associated with the trouble shooting procedure.

10. The system as claimed in claim 1, wherein the voice and data network includes voice grade circuits.

11. The system as claimed in claim 1, wherein the voice and data network includes point-to-point private lines.

12. The system as claimed in claim 1, wherein the data includes ISDN lines.

13. The system as claimed in claim 1, wherein the performance statistics includes data relating to switched network throughput.

14. The system as claimed in claim 1, wherein the performance statistics includes data relating to switched network latency.

15. The system as claimed in claim 1, wherein the client browser application is initiated in a Web browser.

16. The system as claimed in claim 1, wherein the presentation device further includes a graphical user interface and may be launched directly from the client browser application.

17. The system as claimed in claim 1, wherein the presentation device further includes a graphical user interface and may be launched directly from a Web browser window.

18. The system as claimed in claim 1, wherein the system further includes a report viewer device for enabling display of reports in accordance with customer input, the customer input indicating reporting views selected from graphical, tabular, and spreadsheet views.

19. The system as claimed in claim 18, wherein the report viewer device further enables simultaneous multiple graph reporting views.

20. The system as claimed in claim 19, wherein the graphical view includes a drill down view within a customer's premise equipment for viewing a breakdown of the customer's equipment, the breakdown including individual channels within each circuit.

21. A method for communicating information relating to a customer's voice and data network from an enterprise to a customer via an integrated Web-based interface, the method comprising:
    providing a client browser application located at a client workstation for enabling interactive Web-based communications between the customer and the integrated interface;
    receiving and storing at the enterprise, the performance statistics collected from the voice and data network;
    calculating and deriving alarms from the performance statistics based on predefined thresholds;
    presenting the derived alarms to the customer at the client workstation.

22. The method according to claim 21, wherein the method further comprises enabling the customer at the client workstation to define and modify the predefined thresholds via the client browser application.

23. The method according to claim 21, wherein the method further comprises presenting to the customer at the client workstation customized reports based on the performance statistics collected from the voice and data network in near real-time.

24. The method according to claim 21, wherein the method further comprises notifying customers via paging service when the alarms are received.

25. The method according to claim 21, wherein the method further comprises notifying customers via fax service when the alarms are received.

26. The method according to claim 21, wherein the method further comprises notifying customers via e-mail when the alarms are received.

27. The method according to claim 21, wherein the method further comprises launching a trouble shooting procedure associated with the alarm when the customer acknowledges the alarm presented at the client workstation.

28. The method according to claim 27, wherein the method further comprises enabling t he customer to define the trouble shooting procedure associated with an alarm.

* * * * *